(12) United States Patent  (10) Patent No.: US 7,443,392 B2
Tsubaki  (45) Date of Patent: Oct. 28, 2008

(54) IMAGE PROCESSING PROGRAM FOR 3D DISPLAY, IMAGE PROCESSING APPARATUS, AND 3D DISPLAY SYSTEM

(75) Inventor: Hidetoshi Tsubaki, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 11/250,975

(22) Filed: Oct. 14, 2005

(65) Prior Publication Data

US 2006/0082574 A1   Apr. 20, 2006

(30) Foreign Application Priority Data

Oct. 15, 2004   (JP) ............................. 2004-300895

(51) Int. Cl.
*G06T 15/00*   (2006.01)
(52) U.S. Cl. ............................ 345/419; 348/42; 348/51; 382/321
(58) Field of Classification Search ................. 345/419, 345/418; 348/42–44, 54, 59, 51; 382/32, 382/321
See application file for complete search history.

(56) References Cited

U.S. PATENT DOCUMENTS 6,064,424 A   5/2000   van Berkel et al. ............ 348/51
6,603,504 B1*   8/2003   Son et al. ...................... 348/54
6,801,243 B1*  10/2004   Van Berkel .................. 348/59
7,277,121 B2* 10/2007   Mashitani et al. ............. 348/51

FOREIGN PATENT DOCUMENTS

| JP | 57-011592   | 1/1982 |
| JP | 07-129792   | 5/1995 |
| JP | 09-236777   | 9/1997 |
| JP | 10-232665   | 9/1998 |
| JP | 2003-209858 | 7/2003 |

OTHER PUBLICATIONS

Steven M. Seitz, C.R. Dyer, View Morphing, Proc. SIGGRAPH 96, pp. 21-30, 1996.

* cited by examiner

*Primary Examiner*—Phu K Nguyen
(74) *Attorney, Agent, or Firm*—Cowan, Liebowitz & Latman, P.C.

(57) ABSTRACT

An image processing program includes the first step (S101, S102) of acquiring the first parameter serving as a parameter associated with 3D display on the first 3D display device, and acquiring the first 3D image data corresponding to the first parameter, the second step (S103) of acquiring the second parameter serving as a parameter associated with 3D display on the second 3D display device, and the third step (S104) of generating the second 3D image data corresponding to the second parameter on the basis of the first 3D image, the first parameter, and the second parameter.

7 Claims, 22 Drawing Sheets

IMAGE PROCESSING PROGRAM FOR 3D DISPLAY, IMAGE PROCESSING APPARATUS, AND 3D DISPLAY SYSTEM

FIELD OF THE INVENTION

The present invention relates to an image processing program for generating an image for 3D display, an image processing system, and a 3D display apparatus having them.

BACKGROUND OF THE INVENTION

A 3D display device includes, as building elements, a lenticular element (a lenticular lens element), and a polarized optical element for parallax stereogram, integral photo, and the like, and enables observation of a 3D image. The 3D display device displays an image corresponding to each viewpoint by a screen-divisional scheme or time-divisional scheme, and guides light from each image to each viewpoint.

There is proposed a service of distributing image data (image contents) for 3D display via a communication network such as a digital broadcasting network or the Internet. In distributing an image, depth data of the 3D space and data containing a large number of multi-viewpoint image groups are distributed. From the distributed data, the user can generate a composite image (to be described later) complying with a user's 3D display device by an arbitrary viewpoint image generation process (to be described later). Image data can, therefore, be distributed regardless of the amount of parallax of a 3D image which changes depending on a pixel arrangement style defined by a 3D display device, the number of viewpoints, and other parameters and specifications (to be referred to as 3D display parameters collectively hereinafter).

The arbitrary viewpoint image generation process is a process of inputting two or more viewpoint images, and generating an image corresponding to a viewpoint different from the input viewpoint images. One method of the arbitrary viewpoint image generation process use a 3D model. To the contrary, an arbitrary viewpoint image generation process which does not use any 3D model is also called an image-based rendering process, and has enthusiastically been studied these days. As a typical example of this process proposed by Seitz et al., a warping process is done using depth data of the 3D space that is generated from a correspondence extracted from two viewpoint images, and an intermediate viewpoint image is generated (Steven M. Seitz, C. R. Dyer, View Morphing, Proc. SIGGRAPH 96, pp. 21-30, 1996).

Considering efficient use of a communication network, it is very redundant and inefficiency to directly distribute depth data of the 3D space of each scene and a multi-viewpoint image group. Thus, for a screen-divisional type 3D display device, it is more practical to generate a composite image (3D image) so as to comply with a specific 3D display device, and distribute the composite image.

A composite image is final image data for presenting a 3D image by using a 3D display device. An example of the composite image is shown in FIG. 3 (details thereof will be explained in the following embodiment). FIG. 3 illustrates an example of a composite image at five viewpoints.

When each pixel of a display is made up of three, red (R), green (G), and blue (B) subpixels, as shown in FIG. 3, adjacent viewpoint images of different R, G, and B subpixels are displayed to prevent color misregistration on the observation plane (plane on which viewpoints are aligned) (see Japanese Patent Laid-Open No. 57-11592).

Further, when lenticular lenses are arranged so that the generatrix directions of lens parts match the vertical direction, or the apertures of a parallax barrier are aligned in the vertical direction, the vertical resolution of a presented 3D image decreases. The decrease in the resolution of a 3D image is suppressed by arranging lenticular lenses so that the generatrix directions of lens parts extend obliquely, or properly distributing barrier apertures in the vertical and horizontal directions (see U.S. Pat. No. 6,064,424).

As described above, the pixel arrangement required for a composite image changes depending on the number of viewpoints of a 3D display device, and also depending on 3D display parameters such as the configuration and display scheme of the 3D display device even when the number of viewpoints is kept unchanged.

However, there has not conventionally been proposed any method of observing a composite image generated for a specific 3D display device on another 3D display device having different 3D display parameters. Image contents which are generated and distributed for a specific 3D display device can be observed on only the specific 3D display device. In this situation, the portability of image contents between 3D display devices having different 3D display parameters is very poor.

SUMMARY OF THE INVENTION

According to one aspect of the present invention, there is provided an image processing program comprising a first step of acquiring a first parameter serving as a parameter associated with 3D display on a first 3D display device, and acquiring a first 3D image data corresponding to the first parameter, a second step of acquiring a second parameter serving as a parameter associated with 3D display on a second 3D display device, and a third step of generating a second 3D image data (composite image or multi-viewpoint image group) corresponding to the second parameter on the basis of the first 3D image, the first parameter, and the second parameter.

According to another aspect of the present invention, there is provided an image processing apparatus comprising a data acquisition unit which acquires a first parameter serving as a parameter associated with 3D display on a first 3D display device, a first 3D image data corresponding to the first parameter, and a second parameter serving as a parameter associated with 3D display on a second 3D display device, and an image generation unit which generates a second 3D image data corresponding to the second parameter on the basis of the first 3D image, the first parameter, and the second parameter.

A 3D display system can also be built by the image processing apparatus, and a 3D display device which outputs (displays or prints) a second 3D image data and presents a 3D image to a plurality of viewpoints.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a view showing an example of a viewpoint position before and after image conversion according to the fourth embodiment;

DETAILED DESCRIPTION OF THE PREFERRED EMBODIMENTS

Preferred embodiments of the present invention will now be described in detail in accordance with the accompanying drawings.

In order to solve the conventional problems, it is an object of the embodiments to provide an image processing program which improves the portability of image contents between various 3D display devices, an image processing apparatus, and a 3D display system.

First Embodiment

The first embodiment will describe the configuration of a 3D display system in which the first composite image (first 3D image) having a pixel arrangement corresponding to the first 3D display (first 3D display device) is converted into the second composite image (second 3D image) complying with 3D display parameters representing the device characteristics of the second 3D display (second 3D display device), thereby presenting a 3D image.

A case wherein the number of viewpoints (and the interval of the viewpoint) of the first 3D display and that of the second 3D display are equal to each other will be explained. A 3D display device according to the first embodiment is a so-called screen-divisional type display device which enables observation of a 3D image by displaying a composite image in the same screen. In this case, the composite image is obtained by laying out, in a matrix in a predetermined order, pixels (viewpoint pixels) which form images (viewpoint images) corresponding to respective viewpoints.

Figure 12:
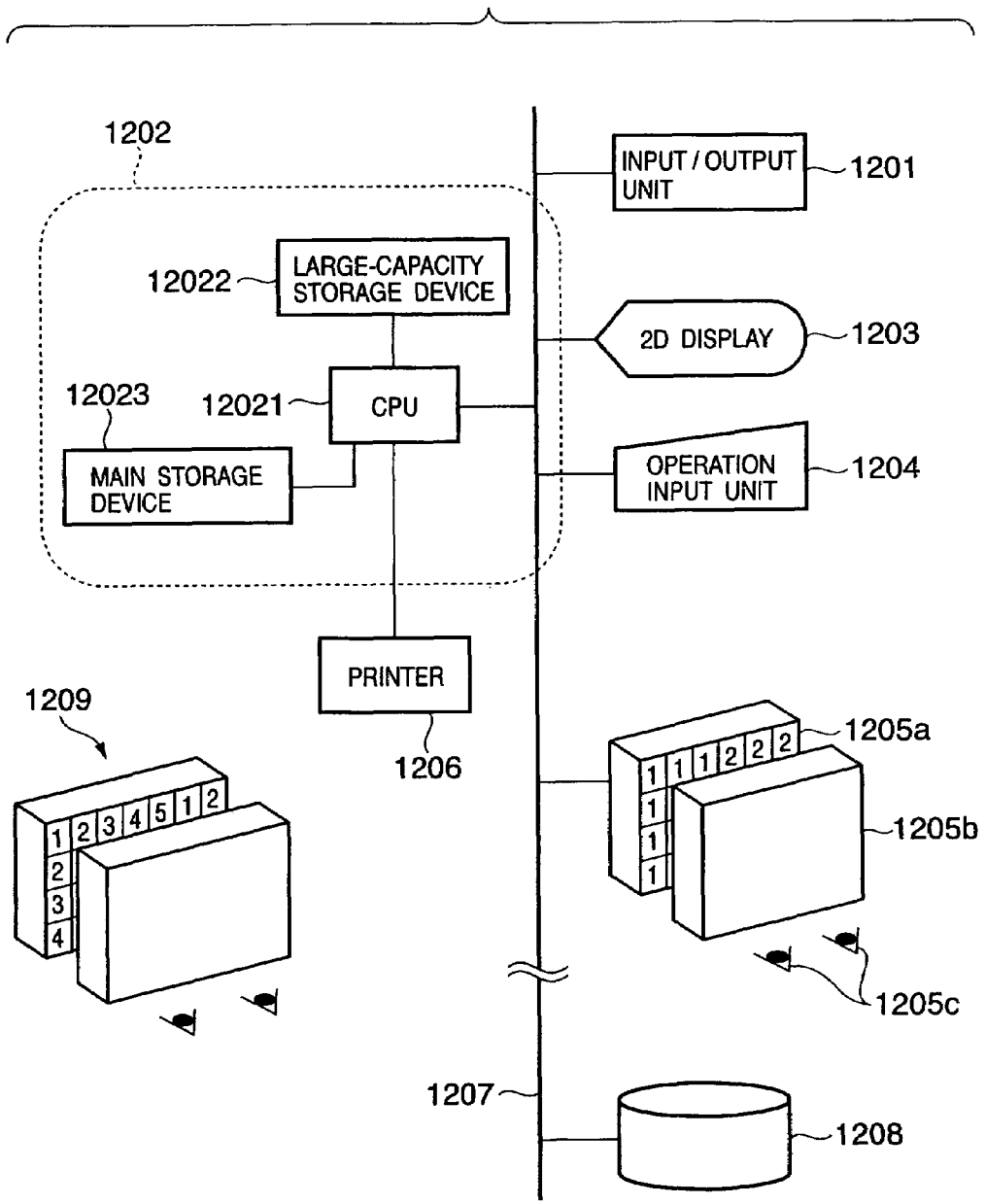
FIG. 12 is a block diagram showing the configuration of a 3D display system according to the first to fourth embodiments.

FIG. 12 is a block diagram showing the configuration of the 3D display system according to the first embodiment. In FIG. 12, reference numeral 1201 denotes an input/output unit for data from/to an external apparatus. The input/output unit 1201 inputs the first composite image, and outputs the second converted composite image. When information on the pixel arrangement parameter of a composite image is given as file data, the data is input via the input/output unit 1201. The input/output unit 1201 is formed from a drive unit which reads/writes data from/in a recording medium (e.g., a magnetic disk, optical disk, or semiconductor memory). The input/output unit 1201 may also be formed from, e.g., a communication port connected to a network, and a tuner, antenna, receiver, and transceiver which transmit/receive data by digital broadcasting or radio communication.

Reference numeral 1202 denotes an image processing apparatus which converts the first input composite image into the second composite image for presenting a 3D image by using the second 3D display device of the system, and sends the second composite image as a video signal to the second 3D display device. The image processing apparatus 1202 is formed from, e.g., a general-purpose personal computer.

A 2D display 1203 is formed from a display element such as a liquid crystal panel (LCD). The image processing apparatus 1202 acquires information necessary for conversion and 3D display of a composite image interactively from the user via display on the 2D display 1203, and assists acquisition of the information. The display 1203 also displays the process status of the image processing unit 1202 and various operation menus.

Reference numeral 1204 denotes an operation input unit which is made up of a mouse, keyboard, joystick, and the like. The user can select a function and input/output data while seeing a menu image displayed on the 2D display 1203. The 2D display 1203 may be formed from a touch panel or the like, and function as an operation input unit.

Reference numeral 1205 denotes a 3D display which serves as the second 3D display device, and is made up of a display element 1205a (e.g., an LCD or cathode-ray tube) for displaying the second converted composite image, and a display optical system 1205b for guiding light from each pixel (viewpoint pixel) of the display element 1205a to a predetermined viewpoint 1205c and presenting a 3D image.

The 3D display 1205 may function as both 2D and 3D displays, as proposed in Japanese Patent Laid-Open No. 10-232665. In this case, the 3D display 1205 can be arbitrarily used such that only a composite image is 3D-displayed and data other than a composite image is 2D-displayed.

Reference numeral 1206 denotes a printer which serves as another second 3D display device, and prints a composite image converted by the image processing unit 1202. The printer 1206 can print not only on a general medium (e.g., paper or film), but also on a polarized optical element (e.g., a lenticular sheet or integral photo sheet) for observing a 3D image. The printer 1206 may be a printer which targets 3D image printing, such as a holographic stereogram printer which converts a composite image into hologram information and prints 3D information. The printer 1206 may print on, e.g., paper which enables 3D observation by superposing paper on the polarized optical element.

Reference numeral 1207 denotes a network such as the Internet. The image processing apparatus 1202 can acquire a composite image from a database 1208 (to be described later) and 3D display parameter data of another 3D display device via the network 1207.

In association with predetermined keywords, the database 1208 saves composite image data files serving as input sources, and 3D display parameter data corresponding to various 3D display devices of especially the screen-divisional scheme (e.g., the pixel arrangement style of a composite image, the number of viewpoints, the interval of the viewpoints, and the amount of parallax). When downloading of data is designated together with a keyword input via the operation input unit 1204, the image-processing apparatus 1202 can download target data.

Reference numeral 1209 denotes a 3D display which serves as the first 3D display device and has 3D display parameters different from those of the second 3D display devices (3D display 1205 and printer 1206), as described above.

The configuration of the image processing apparatus 1202 will be explained. Reference numeral 12021 denotes a controller such as a CPU which controls the whole image processing apparatus.

Reference numeral 12022 denotes a large-capacity storage device which saves the first input composite image and 3D display parameter data, and saves the second converted composite image. The storage device 12022 is formed from a hard disk or the like.

Reference numeral 12023 denotes a main storage device which is formed from a RAM or the like. The main storage device 12023 can rasterize the first input composite image and 3D display parameter data, and temporarily store a multi-viewpoint image group (to be described later) serving as an intermediate generation image during conversion. The main storage device 12023 also has a function of temporarily storing the second converted composite image data before the data is displayed, stored in the large-capacity storage device 12022, or output from the input/output unit 1201.

Figure 1:
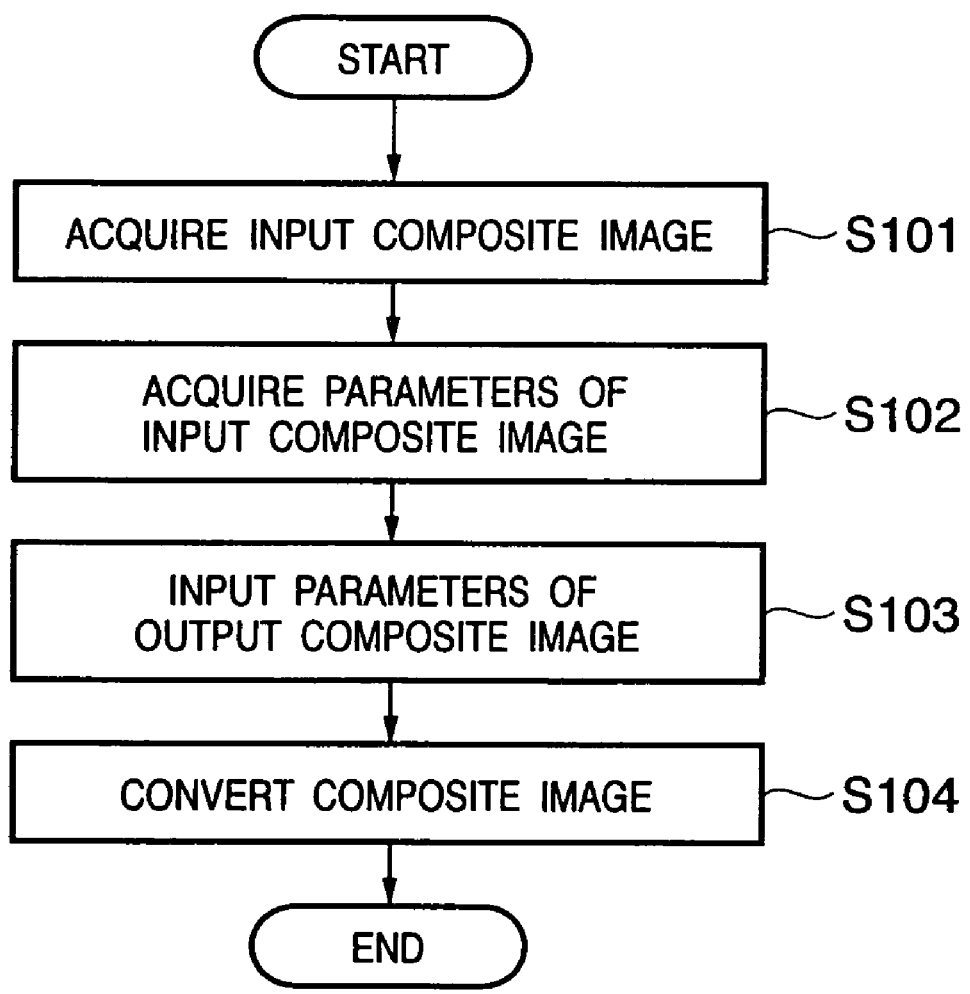
FIG. 1 is a flowchart showing a process by an image processing apparatus in a 3D display system according to the first to fourth embodiments of the present invention.

FIG. 1 is a flowchart showing the program of a composite image conversion process according to the first embodiment. This program is executed by the image processing apparatus 1202 (controller 12021 as a computer).

In step (to be simply referred to as "S" hereinafter) 101, the first composite image (to be referred to as an input composite image hereinafter) is input. The input composite image is image data which is generated for the 3D display 1209 of the screen-divisional scheme different in 3D display parameters from the second 3D display devices 1205 and 1206 in the first embodiment.

Figure 3:
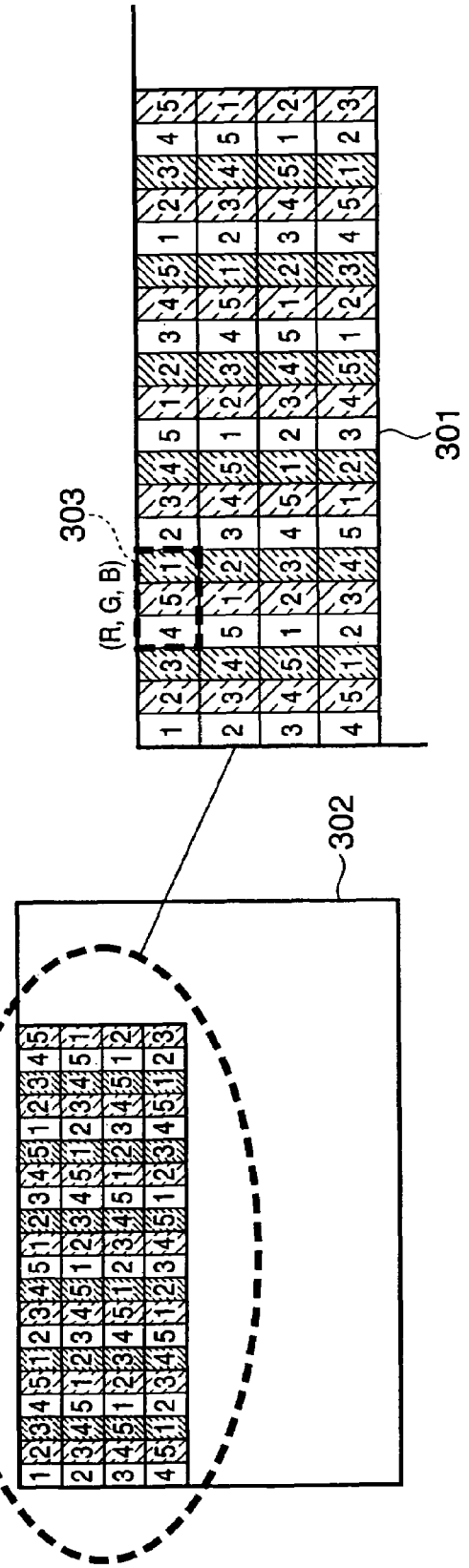
FIG. 3 is a view showing an example of a composite image.

FIG. 3 shows a typical pixel arrangement of a composite image. In FIG. 3, reference numeral 302 denotes an entire composite image; and 301, part of the composite image 302.

As described above, a composite image is final image data for presenting a 3D image by using a 3D display device. In FIG. 3, cells numbered with 1 to 5 are viewpoint pixels (subpixels) for displaying viewpoint images corresponding to the numbered viewpoints, and one pixel 303 is made up of three, red (R), green (G), and blue (B) subpixels. In FIG. 3, subpixels of the same color among red (R), green (G), and blue (B) are laid out in stripe areas which are classified by the same color. Three subpixels in one pixel display different viewpoint images. That is, in the example shown in FIG. 3, a composite image is formed by arranging stripe images of three colors formed from five viewpoint pixels cyclically in the horizontal direction.

In order to generate a composite image, a plurality of images (viewpoint images) are generated in advance by photography, computer graphics (CG), or the like while the viewpoint is moved from one point to the other point along the horizontal direction at predetermined intervals. The numbers 1 to 5 in FIG. 3 represent the photographing or generation order, i.e., viewpoint numbers. A plurality of viewpoint images are converted into image data having the above-mentioned pixel arrangement, thereby generating a composite image. FIG. 3 illustrates a composite image at five viewpoints, but a composite image at two to four viewpoints or six or more viewpoints may be generated.

In S102, 3D display parameters corresponding to an input composite image (to be simply referred to as the 3D display parameters of an input composite image hereinafter) on the first 3D display device are acquired. The 3D display parameters include the pixel arrangement style of the 3D display 1209 that corresponds to an input composite image, the number of viewpoints, the image size, the interval of the viewpoints, and the parallax distribution range (maximum amount of parallax) between viewpoint images. The interval of the viewpoints corresponds to the photographing base line length when each viewpoint image serving as an original image for generating an input composite image is photographed. The parallax distribution is obtained from two arbitrary reference viewpoints which form an input composite image. In addition, the 3D display parameters include information useful in determining the parallax distribution of each scene, such as the focal length of a photographing apparatus, and the presence/absence of convergence of the photographing optical axis.

In general, the viewpoint position of a multi-viewpoint image group which forms a composite image is photographed with a camera arrangement of parallel-eyed viewing or convergent cross-eyed viewing. Parallel-eyed viewing means that the photographing optical axis directions of a camera having a moving locus in a plane perpendicular to the optical axis of the camera are parallel to each other. Convergent cross-eyed viewing means that the gazing point is set on a given object, and a plurality of viewpoint images are photographed while the position of the gazing point is moved so that the photographing optical axis direction of the camera always coincides with the gazing point.

The pixel arrangement style may be table data which can specify the arrangement order, a mathematical expression, or partial pattern data.

Figure 2:
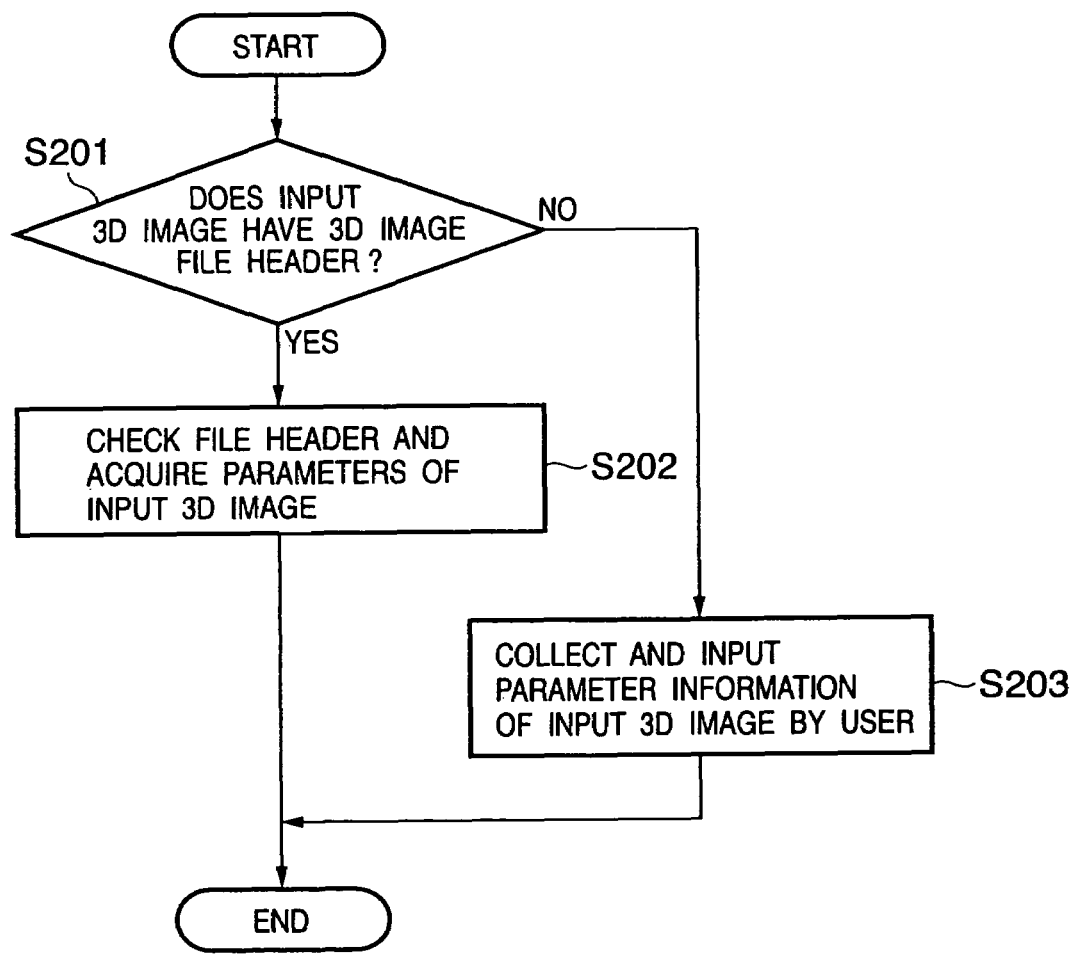
FIG. 2 is a flowchart showing a sequence of acquiring the parameters of an input composite image by the image processing apparatus in the 3D display system according to the first to sixth embodiments of the present invention.

FIG. 2 shows a sequence of acquiring 3D display parameters in S102. In S201, it is confirmed whether input composite image data has a file header containing 3D display parameters. If the data has a file header containing 3D display parameters, the 3D display parameters are acquired in S202 by referring to the file header. When the pixel arrangement table can be directly obtained, this step may be omitted because information on the number of viewpoints and the image size can be obtained from the pixel arrangement table.

Even if the file header does not contain any 3D display parameter, a data base or data file for 3D display parameters for which a target 3D display device name or the like is contained as a keyword in header information may be generated. In loading the composite image data file, corresponding 3D display parameters are read out and acquired from the database or data file on the basis of the keyword in the file header. The data file or database suffices to be held in the fixed storage area of a storage medium or terminal or the database 1208 on the network 1207 shown in FIG. 1.

If a file header containing 3D display parameters does not exist, the user inputs 3D display parameters corresponding to an input composite image via the operation input unit 1204 in S203. For example, the user directly inputs numerical values representing 3D display parameters, and for the pixel arrangement style, inputs an arrangement pattern or a mathematical expression representing an arrangement or selects a corresponding pixel arrangement from pixel arrangement candidates displayed on the 2D display 1203. More specifically, the user inputs a pixel arrangement pattern representing the pixel arrangement as shown in FIG. 3, a partial pattern which enables analogy of the entire pattern, a mathematical expression, or the like. When there is, e.g., scaling information associated with pitch adjustment for correcting the manufacturing error of a 3D display device, the information is input, as needed.

In S103, 3D display parameters (to be simply referred to as the 3D display parameters of an output composite image hereinafter) corresponding to the second output composite image (to be referred to as an output composite image hereinafter) on the second 3D display device are input. Similar to the 3D display parameters of the input composite image, the 3D display parameters of the output composite image also include the pixel arrangement styles of the second 3D display devices 1205 and 1206 that correspond to output composite images, the number of viewpoints, the image size, and the parallax distribution range between viewpoint images.

It is cumbersome that the user directly inputs all parameters. Thus, a data file containing 3D display parameters may be input via the input/output unit 1201. Alternatively, the user may input a keyword such as the name of a 3D display device used for output, and read out 3D display parameter data containing the keyword in header information from the database or the like.

When the image processing apparatus 1202 has a plug-and-play function, 3D display parameters, or keyword information necessary to acquire 3D display parameters from the database may be acquired from the second 3D display devices 1205 and 1206. When only keyword information is obtained, the database is searched using the keyword information to acquire 3D display parameters corresponding to a target 3D display device.

In S104, an input composite image is converted into an output composite image. More specifically, an output composite image is generated on the basis of the input composite image, 3D display parameters corresponding to the input composite image, and 3D display parameters corresponding to the output composite image.

In the first embodiment, as described above, the input and output composite images (i.e., the first and second 3D display devices) have the same number of viewpoints and the same interval of the viewpoints, and parallax distribution adjustment, i.e., 3D effect adjustment upon a change in the number of viewpoints and the interval of the viewpoints is not executed. That is, a case wherein only the pixel arrangement is changed will be mainly described.

Figure 4:
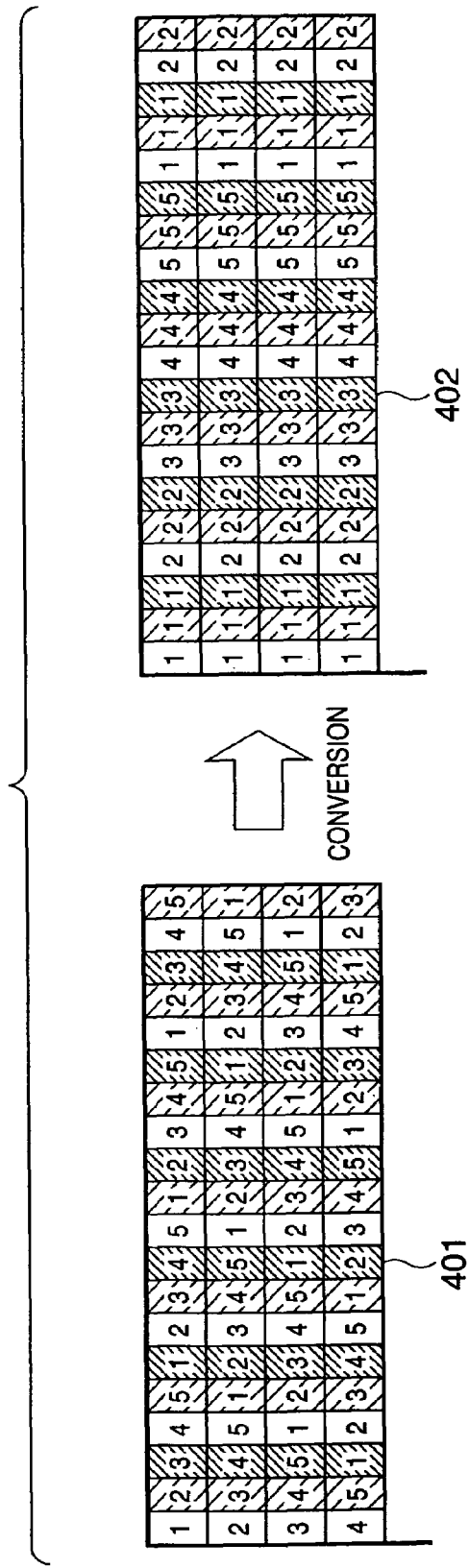
FIG. 4 is a view showing an example of conversion of a composite image.

FIG. 4 shows an example of conversion of a composite image. In FIG. 4, reference numeral 401 denotes a pixel arrangement for part of a composite image (input composite image) before conversion. This pixel arrangement is identical to that shown in FIG. 3. Reference numeral 402 denotes a pixel arrangement for part of composite image data (output composite image) after conversion.

An input composite image having the pixel arrangement 401 is a typical example of a 5-viewpoint composite image for a 3D display device using a so-called oblique lenticular element, which has been described in BACKGROUND OF THE INVENTION. To the contrary, an output composite image having the pixel arrangement 402 is a typical example of a 5-viewpoint composite image for a 3D display device using a general lenticular element in which the generatrix direction of the lens is perpendicular to the transverse direction of the screen.

Figure 6:
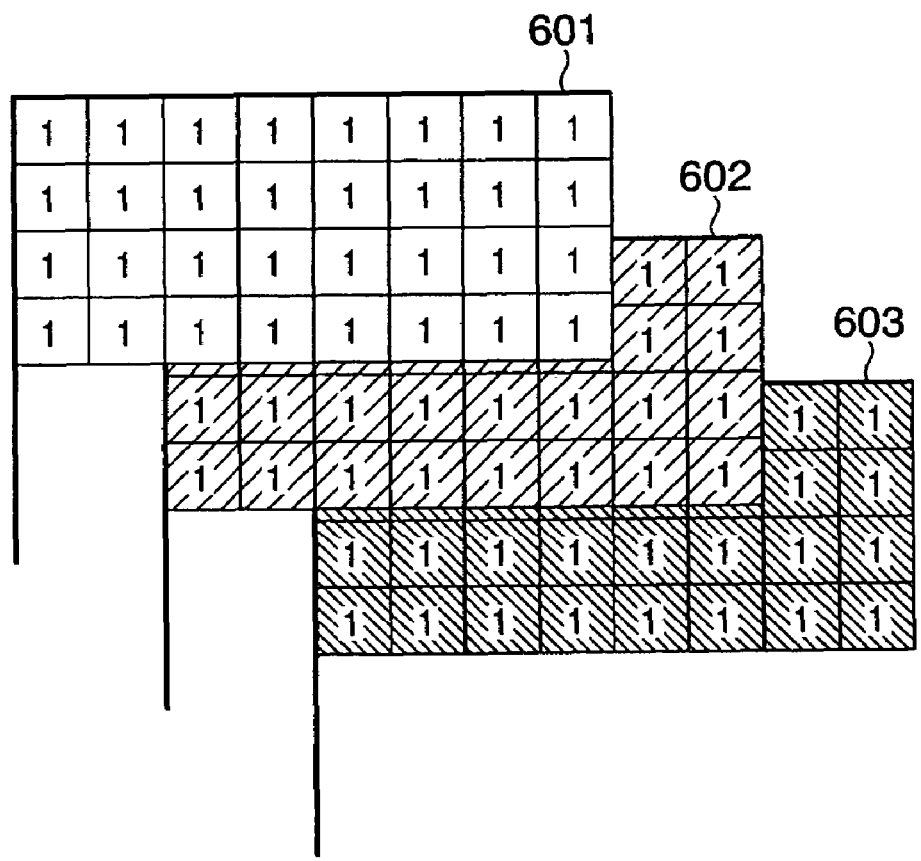
FIG. 6 is a view showing images which are decomposed into R, G, and B layers.

For an input composite image, three, red (R), green (G), and blue (B) subpixels which form one pixel in an actual space are laid out in different pixels on the display. For an output composite image, three, red (R), green (G), and blue (B) subpixels which form one pixel in an actual space are laid out in the same pixel on the display. In other words, the second composite image data corresponds to data obtained when a red (R) layer 601, green (G) layer 602, and blue (B) layer 603 on each of which subpixels of the same color are collected are shifted by one sub-pixel and superposed on each other, as shown in FIG. 6.

In addition to composite images described in the first embodiment, the screen-divisional 3D display scheme can provide a variety of composite images having various pixel arrangements corresponding to the characteristics of a 3D display device. A combination of composite images before and after conversion is arbitrary.

Figure 5:
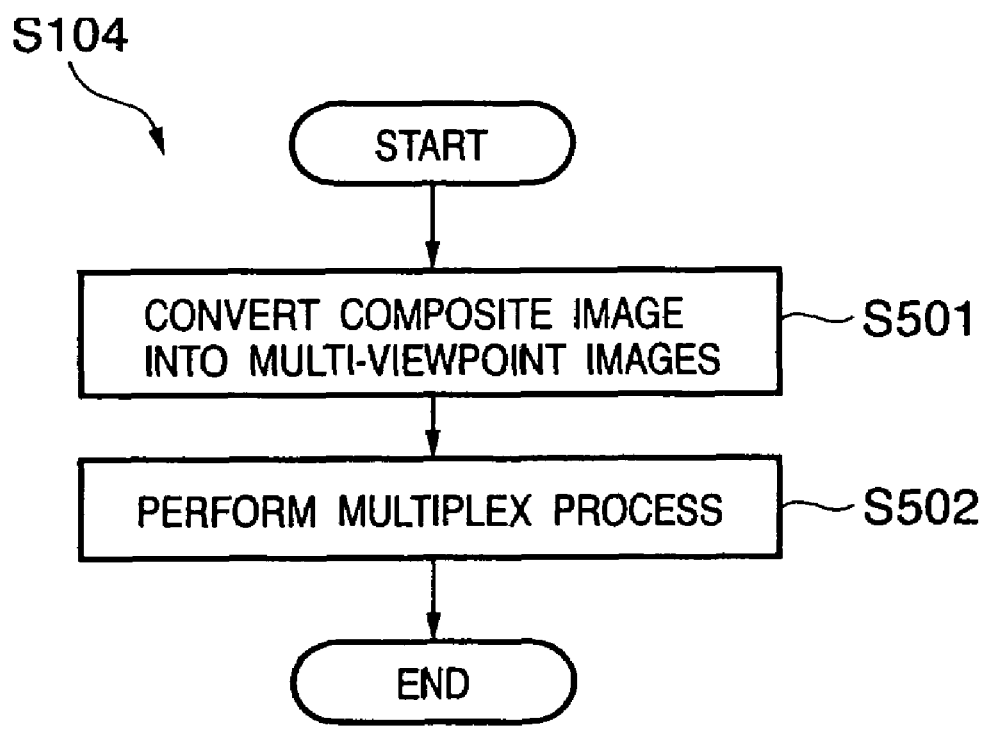
FIG. 5 is a flowchart showing a composite image conversion process according to the first to fourth embodiments of the present invention.

FIG. 5 shows a sequence of converting a composite image. In S501, a composite image input in S101 of FIG. 1 is converted into a multi-viewpoint image group.

Figure 7:
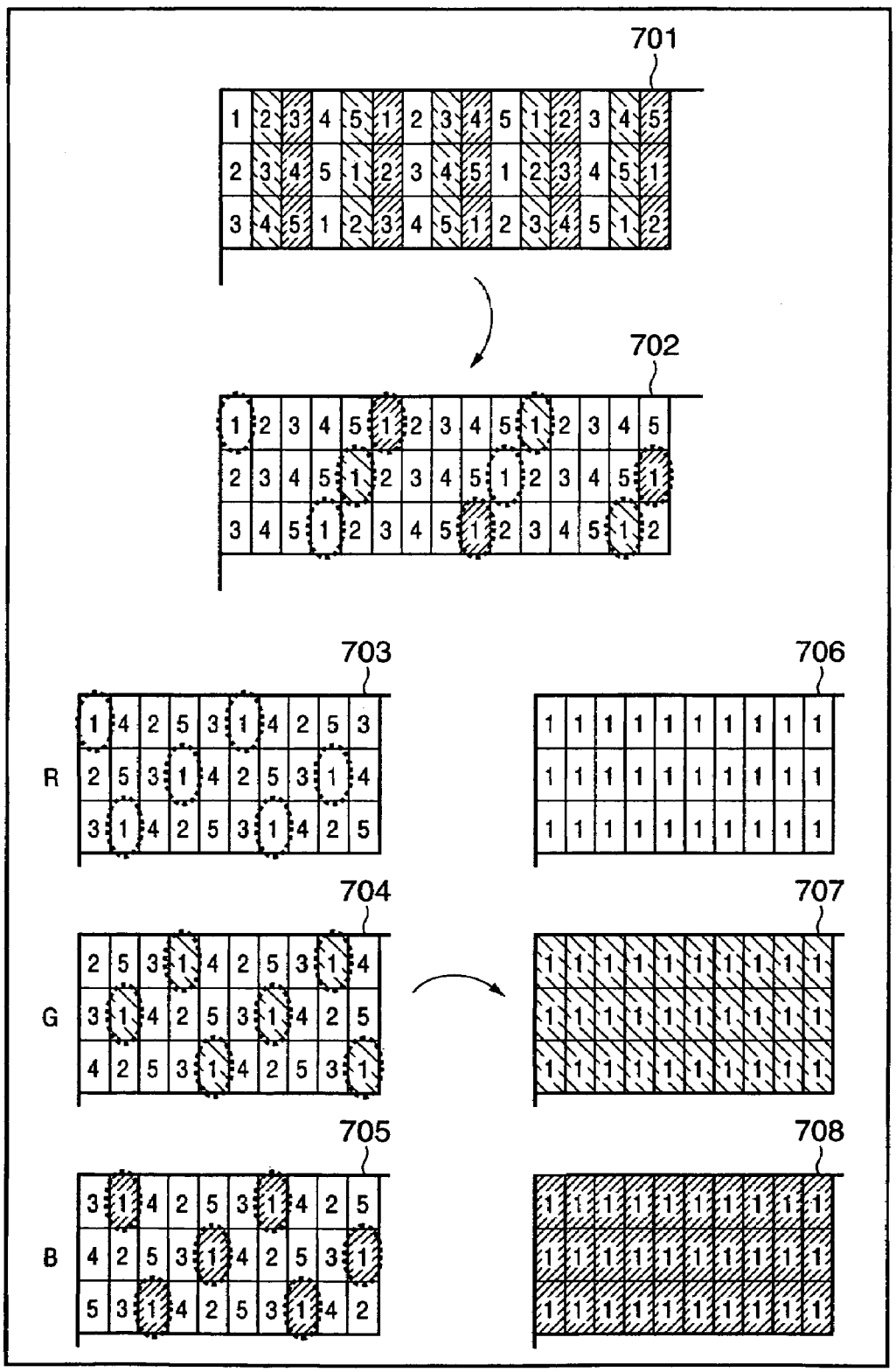
FIG. 7 is a view for explaining pixel interpolation on a viewpoint image.

Giving attention to a composite image having the pixel arrangement 401 in FIG. 3 at each viewpoint, as shown in FIG. 7, a viewpoint image (representing R, G, and B viewpoint images corresponding to the first viewpoint in FIG. 7) 702 on a composite image 701 can be regarded as an image which is obtained by sparse sampling and loses pixel information (color information and luminance information of the pixel) owing to pixel missing when the composite image is generated.

In S501, the viewpoint image 702 in which subpixels of the three colors are laid out in the same plane is decomposited into R, G, and B layers, as shown in FIG. 7. Reference numeral 703 denotes an R pixel layer; 704, a G pixel layer; and 705, a B pixel layer.

Only by decompositing one viewpoint image 702 on the composite image 701 into the color layers 703 to 705, subpixels of the respective colors at a given viewpoint sparsely exist in the respective layers, and pixel information of an area where subpixels at another viewpoint exist before decomposition is lost. For this reason, missing pixels are interpolated on each color layer at each viewpoint to create a viewpoint image without any missing pixel. This process is the process of conversion into multi-viewpoint image data in S501.

The result of interpolating missing pixel information is shown in FIG. 7. Reference numeral 706 denotes an R pixel layer at the first viewpoint; 707, a G pixel layer at the first viewpoint; and 708, a B pixel layer at the first viewpoint. In this way, a viewpoint image at the first viewpoint is interpolated and generated, and viewpoint images at other viewpoints are sequentially interpolated and generated.

Figure 8:
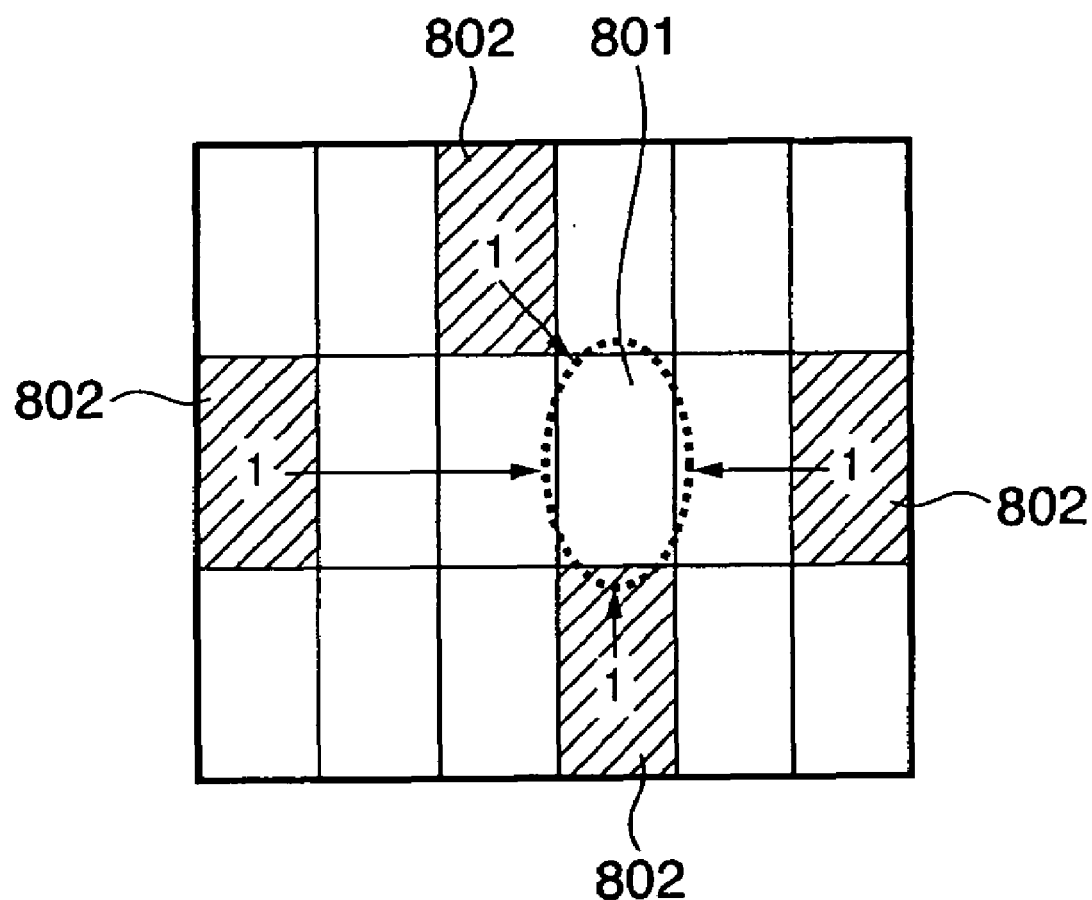
FIG. 8 is a view for explaining a pixel interpolation method using neighboring pixel information.

As the interpolation method, interpolation is simply done for each color layer. For example, as shown in FIG. 8, data of one or a plurality of subpixels 802 around a subpixel 801 to be interpolated are used, and the subpixel 801 is interpolated using an interpolation method such as nearest neighbor interpolation, linear interpolation, or cubic convolution. In interpolation processing, pieces of pixel information on different color layers having a high correlation may be referred to as luminance information.

Figure 11:
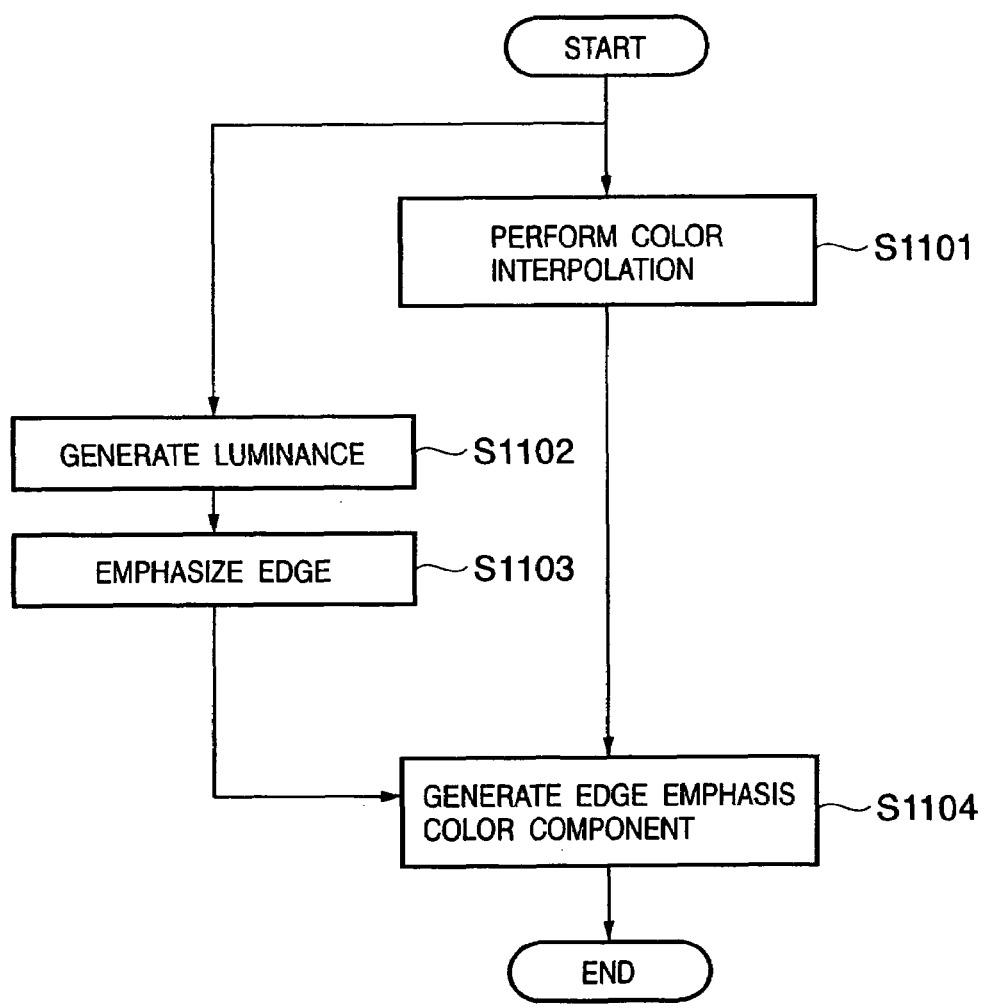
FIG. 11 is a flowchart for explaining an interpolation processing sequence using a Bayer arrangement interpolation technique.

An interpolation method which uses decomposition into color information and luminance information will be further explained. FIG. 11 shows a process sequence using this interpolation method.

S1101 is a color interpolation step, and the above-described pixel interpolation for each color layer is executed. That is, for a pixel (FIG. 7) which is lost on each color layer of each viewpoint image decomposited from a composite image, predictive interpolation is performed on the basis of information of neighboring pixels of the same color and same viewpoint. Information of all R, G, and B pixels (R, G, and B signals) is reconstructed, as shown in FIG. 7.

S1102 is a luminance generation step. In S1102, for each viewpoint image, a color carrier component is removed from pixel information which is distributed as data of R, G, and B color components on a composite image. Pieces of luminance information of R, G, and B components are mixed to calculate a luminance component Y.

S1103 is an edge emphasis step. In S1103, the difference (differential information) between neighboring pixels is calculated as an edge component in the horizontal and vertical directions of a luminance image at each viewpoint that has been generated in S1102. The edge component is added to the original luminance image of each viewpoint to emphasize the edge.

S1104 is a process of generating an edge emphasis color component. In S1104, a color-interpolated image at each viewpoint that has been generated in S1101 and an edge emphasis luminance image at each viewpoint that has been generated in S1103 are composited to generate an edge-emphasized image of R, G, and B signals.

In composition of a color-interpolated image and edge-emphasized image, the color-interpolated image undergoes color difference conversion, and is decomposited into color information and luminance information. In color difference conversion, YCrCb conversion is performed to decomposite the image into color information and luminance information. Note that color difference conversion may adopt another arbitrary decomposition method such as YUV conversion as far as R, G, and B signals are decomposited into luminance information and color information.

Then, luminance information of the color-interpolated image that is decomposited by color difference conversion is replaced with an edge-emphasized luminance image. Primary color conversion is performed using the color difference components Cr and Cb of the color-interpolated image and the replaced luminance component Y, obtaining an image of R, G, and B components. Accordingly, images (multi-viewpoint image group) at respective viewpoints which are formed from R, G, and B signals, as shown in FIG. 7, can be obtained, similar to simple interpolation processing using the respective color layers.

As a method of interpolating a missing pixel in each viewpoint image in a process of converting a composite image into a multi-viewpoint image group, a simple interpolation method using color layers and an interpolation method of decompositing an image into color information and luminance information have been explained. As another missing pixel interpolation method, an arbitrary, more intelligent interpolation method may be employed. For example, an edge image generated from luminance image is used as interpolation control information in interpolating color information.

Further, interpolation processing using pixel information of neighboring coordinates in adjacent viewpoint images may be done in consideration of the amount of parallax in viewpoint images at adjacent viewpoints. By using these interpolation methods, the qualities of a multi-viewpoint image and output composite image can be improved.

Figure 22:
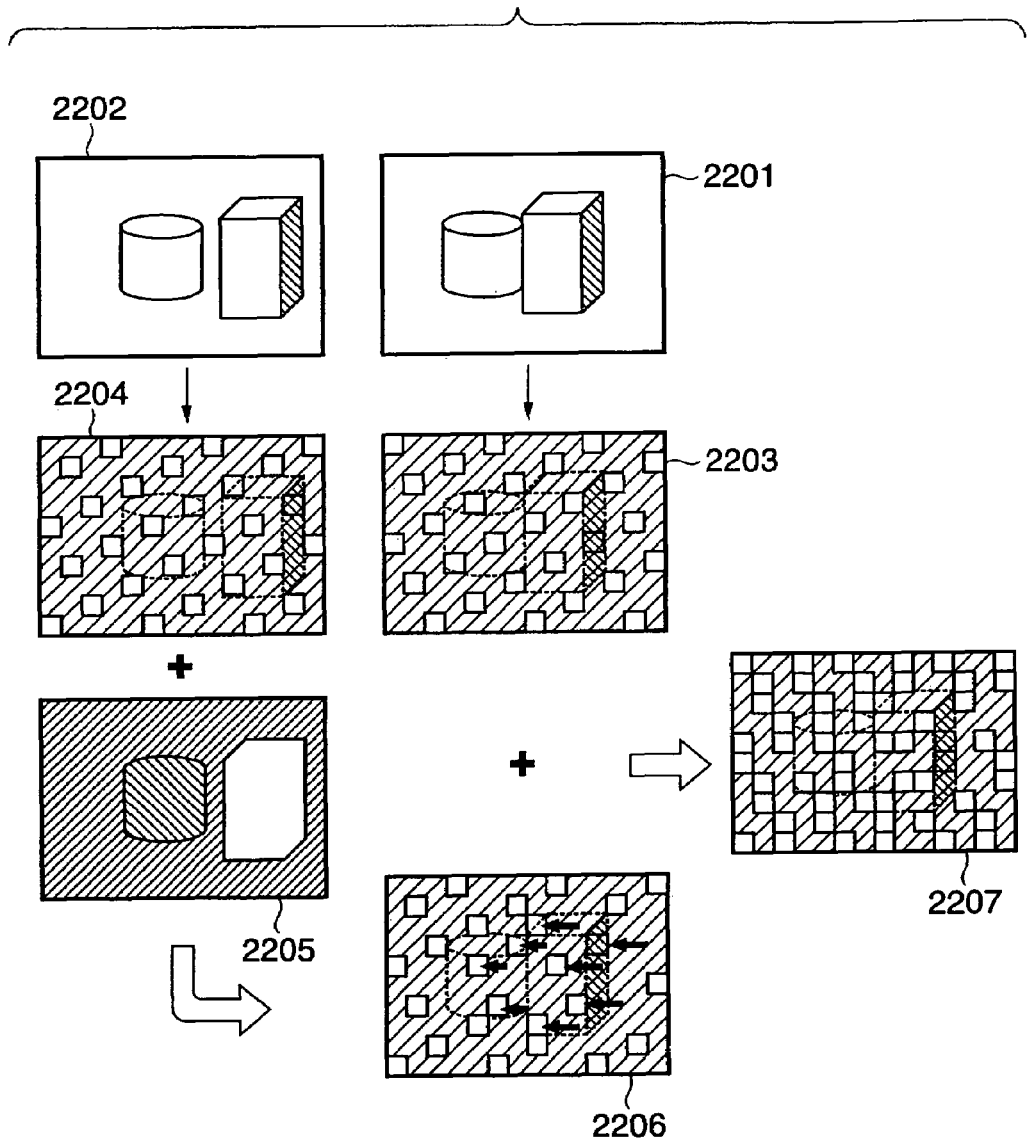
FIG. 22 is a view for explaining generation of a viewpoint image using a parallax map according to the first embodiment.

FIG. 22 shows an example of interpolation using pixel information of neighboring coordinates in consideration of the amount of parallax in adjacent viewpoint images. In this case, pixel information of neighboring coordinates in adjacent viewpoint images is mapped using parallax information, and interpolation is executed using the map.

Reference numeral 2201 denotes an ideal viewpoint image (having no missing pixel) at a given viewpoint in a multi-viewpoint image group which forms a composite image; and 2202, an ideal viewpoint image at a viewpoint adjacent to the viewpoint of the viewpoint image 2201. Reference numerals 2203 and 2204 denote viewpoint images before interpolation processing which are generated from a composite image, respectively correspond to the viewpoint images 2201 and 2202, and contain missing pixels. For example, the viewpoint image 2203 is defined as an image at the first viewpoint (first viewpoint image), and the viewpoint image 2204 is defined as an image at the second viewpoint (second viewpoint image). On the viewpoint images 2203 and 2204, a blank pixel is obtained from a composite image, and a black (gray) pixel is lost from the composite image and must be interpolated.

A purpose of interpolation is to decomposite a composite image and ideally obtain a group of viewpoint images like the viewpoint images 2201 and 2202. However, only a group of viewpoint images having no pixel information, like the viewpoint images 2203 and 2204, can be obtained before interpolation processing owing to pixel missing.

Reference numeral 2205 denotes a parallax map representing parallax amount information of each pixel between the viewpoint images 2203 and 2204 containing missing pixels. The following description is based on the assumption that the parallax map between adjacent viewpoint images has already been obtained by matching between them.

A proper parallax map can be obtained by using a large template between viewpoint images containing missing pixels or performing matching which checks a rough shape between reduced images.

Each pixel on the parallax map has 2D vector information representing parallax amount information of the pixel. In the parallax map 2205 of FIG. 22, the tone represents the magnitude of the vector. That is, a low (dark) tone represents a far position, and a high (bright) tone represents a near position.

Reference numeral 2206 denotes an image (to be referred to as a first viewpoint mapped image hereinafter) obtained by mapping all pixels of the second viewpoint image 2204 to pixel positions which should be seen from the viewpoint of the first viewpoint image 2203 by using parallax amount information of pixels in the parallax map 2205. A vector on the first viewpoint mapped image 2206 represents movement of each pixel by mapping, i.e., the parallax vector of each pixel.

Reference numeral 2207 denotes an interpolated viewpoint image generated by interpolating the first viewpoint image 2203 in accordance with pixel information of the first viewpoint mapped image 2206 generated by mapping the second viewpoint image 2204. The number of missing pixels of the interpolated viewpoint image 2207 can be decreased relatively from that of the first viewpoint image 2203 by performing pixel information interpolation which considers parallaxes in a larger number of adjacent viewpoint images.

The remaining missing pixels of the interpolated viewpoint image 2207 are interpolated by executing the above-described interpolation processing on the viewpoint image. By using pixel information of neighboring coordinates in adjacent viewpoint images that takes the parallax into consideration, much more pixel information in a composite image can be used for conversion into a multi-viewpoint image group, and interpolation processing more faithful to an actual image can be achieved. Since the parallax map is automatically generated, no correspondence point need be manually input. However, correspondence points may be manually input accessorily. When an input composite image is a motion image, information of adjacent frames may be used for interpolation.

In S502 of FIG. 5, a multiplex process is done. In the multiplex process, a multi-viewpoint image group obtained in S501 is input to generate an output composite image. In addition to a substantial multiplex process, a pitch adjustment process is executed, as needed.

The pixel arrangement of the output composite image has been acquired in S103 of FIG. 1. When the pitch adjustment process is performed, pitch adjustment parameters must be acquired (input) in acquiring the 3D display parameters of an output composite image.

Figure 9:
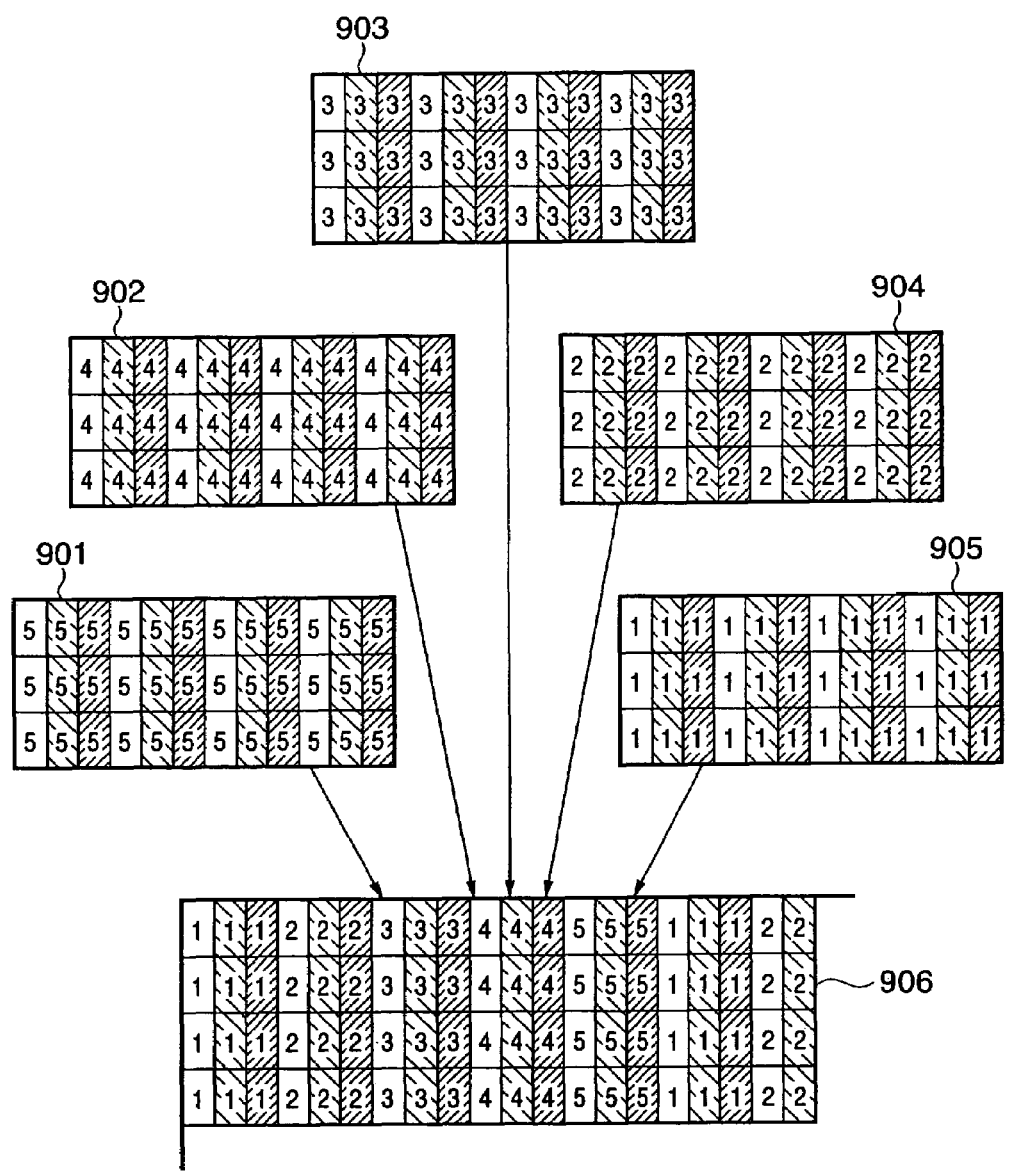
FIG. 9 is a view showing a composite image generated by a multiplex process.

FIG. 9 shows an output composite image generated from a multi-viewpoint image group. Viewpoint images 901 to 905 form an input multi-viewpoint image group. The image 901 is a viewpoint image at the fifth viewpoint, the image 902 is a viewpoint image at the fourth viewpoint, the image 903 is a viewpoint image at the third viewpoint, the image 904 is a viewpoint image at the second viewpoint, and the image 905 is a viewpoint image at the first viewpoint. Reference numeral 906 denotes an output composite image which is generated by the multiplex process.

As for the pixel arrangement of a composite image, for example, when a composite image is generated for a 3D display device which is based on printing (3D printing) using a lenticular element whose lens generatrix direction is perpendicular to the transverse direction of the screen, a pixel at each viewpoint and subpixels which form the pixel are laid out at the same position, as shown in FIG. 9.

Hence, a composite image is generated so that pixels at the same coordinates on viewpoint images which form a multi-viewpoint image group are arranged as adjacent pixels in accordance with the viewpoint arrangement. More specifically, each viewpoint image is decomposed for each pixel (three subpixels) into pixel stripes extending in the vertical direction, and the pixel stripes are cyclically arranged in the horizontal direction in an order opposite to the order of the first to fifth viewpoints.

However, when a composite image is displayed on the display, color misregistration occurs at each viewpoint, and no high-quality 3D image can be observed upon a multiplex process using each pixel (three subpixels) as a minimum unit, similar to the above-mentioned printing. This is because each pixel of most displays is made up of three, red (R), green (G), and blue (B) subpixels aligned in the horizontal direction. Thus, when such a display is targeted, a viewpoint image is changed at each subpixel, and an image is composited so that subpixels at the same coordinates on respective viewpoint images are arranged as adjacent subpixels in accordance with the viewpoint arrangement.

When a decrease in the resolution of a presented 3D image in a specific direction by a multiplex process is suppressed by an oblique lenticular arrangement or oblique barrier aperture arrangement as described in BACKGROUND OF THE INVENTION, a matrix arrangement in which the position of a pixel (or subpixel) at the first viewpoint changes every horizontal pixel line of a composite image is adopted. The composite image 301 shown in FIG. 3 is an example of a composite image having this pixel arrangement.

Which of the pixel arrangements described above is used to generate an output composite image is determined by the 3D display parameters of the output composite image that are acquired in S103.

In the following description, a sequence of generating a 3D printing composite image of a 5-viewpoint image group from a multi-viewpoint image group by using a lenticular sheet formed from a lenticular element whose lens generatrix direction is perpendicular to the transverse direction of the screen will be exemplified.

A 3D stripe image is composited so that pixels at the same coordinates on viewpoint images which form a multi-viewpoint image group are arranged as adjacent pixels in accordance with the viewpoint arrangement.

Letting $P_{jmn}$ (m and n are the indices of horizontal and vertical pixel arrangements) be a pixel value at the jth viewpoint, the jth viewpoint image data is given by the following 2D pixel arrangement:

[Arrangement 1]

$P_{j00}\ P_{j10}\ P_{j20}\ P_{j30}\ \cdots$
$P_{j01}\ P_{j11}\ P_{j21}\ P_{j31}\ \cdots$
$P_{j02}\ P_{j12}\ P_{j22}\ P_{j32}\ \cdots$ Multi-viewpoint images are composited by decompositing an image at each viewpoint into the stripes of respective pixel lines extending in the vertical direction as pixel stripes, and horizontally arranging the pixel stripes in an order opposite to the viewpoint order. The image is composited into the following stripe composite image:

[Arrangement 2]

$P_{100}\ P_{200}\ \cdots\ P_{N00}\ P_{110}\ P_{210}\ \cdots\ P_{N10}\ P_{120}\ P_{220}\ \cdots\ P_{N20}\ \cdots$
$P_{101}\ P_{201}\ \cdots\ P_{N01}\ P_{111}\ P_{211}\ \cdots\ P_{N11}\ P_{121}\ P_{221}\ \cdots\ P_{N21}\ \cdots$
$P_{102}\ P_{202}\ \cdots\ P_{N02}\ P_{112}\ P_{212}\ \cdots\ P_{N12}\ P_{122}\ P_{222}\ \cdots\ P_{N22}\ \cdots$ In the first embodiment, multi-viewpoint images at five viewpoints are composited, and thus the composite image is

[Arrangement 3]

$P_{100}\ P_{200}\ P_{300}\ P_{400}\ P_{500}\ P_{110}\ P_{210}\ P_{310}\ P_{410}\ P_{510}\ P_{120}\ P_{220}\ P_{320}\ P_{420}\ P_{520}$
$P_{101}\ P_{201}\ \cdots\ P_{N01}\ P_{111}\ P_{211}\ \cdots\ P_{N11}\ P_{121}\ P_{221}\ \cdots\ P_{N21}\ \cdots$
$P_{202}\ P_{102}\ \cdots\ P_{N02}\ P_{212}\ P_{112}\ \cdots\ P_{N12}\ P_{122}\ P_{222}\ \cdots\ P_{N22}\ \cdots$ This arrangement represents an image corresponding to a positional relationship in which the first viewpoint is set at the right end and the fifth viewpoint is set at the left end in the space. Pixel stripes are arranged in an order opposite to the viewpoint arrangement order because in observation through the lenticular element, an image is observed reversely in the horizontal direction at one pitch of the lens part.

When the number of viewpoint images each with a size of H×v in an original multi-viewpoint image group is N, the size of a stripe composite image is X (=N×H)×v. When an H×v composite image is to be generated, a viewpoint image is compressed in advance to H/N×v, or the sampling pitch is set to N and pixel lines are extracted one by one from a viewpoint image. When a pixel line is extracted every N pixels, a viewpoint image is smoothed in advance in order to reduce the influence of aliasing.

When an output composite image is a mosaic image which considers a color filter arrangement, the size of an input viewpoint image is changed to the same size as the output size, and pixels at the same coordinates as viewpoint pixels which form the output composite image are extracted from a viewpoint image corresponding to the viewpoint pixels, thereby generating a composite image.

Figure 10:
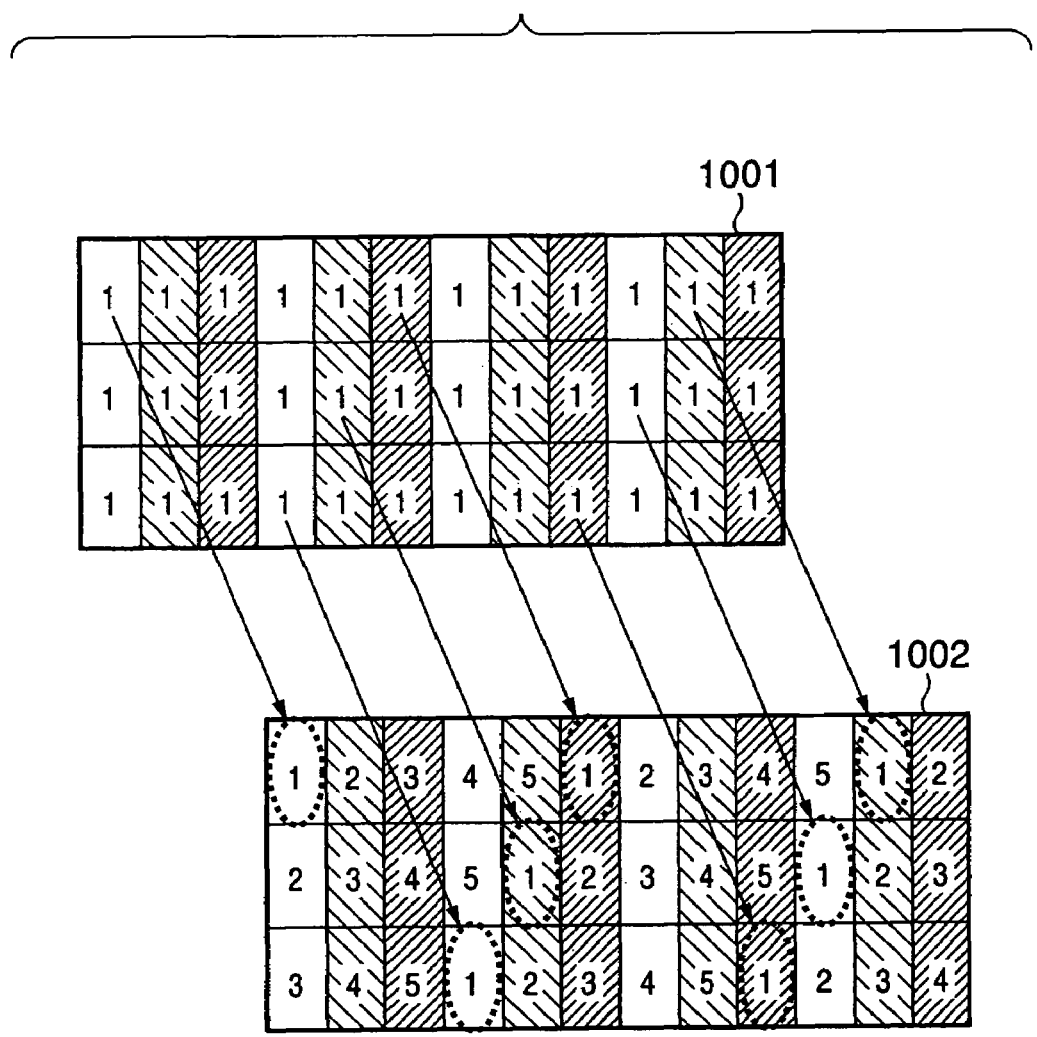
FIG. 10 is a view for explaining a state in which a composite image is generated from a multi-viewpoint image group according to the first to fourth embodiments.

FIG. 10 is a view for explaining a state in which a composite image is generated from a multi-viewpoint image group. Reference numeral 1001 denotes a first viewpoint image which forms a multi-viewpoint image group; 1002, an output composite image. A pixel having a viewpoint index corresponding to the first viewpoint in the pixel arrangement of the output composite image 1002 is sampled from a pixel at the same coordinates in the first viewpoint image. Similarly, a viewpoint image from which a pixel is sampled is sequentially changed to the second viewpoint image, the third viewpoint image, . . . , and pixel information of the output composite image is padded, finally generating a composite image having all pieces of pixel information.

In the first embodiment, for descriptive convenience, pixel sampling is executed after scale conversion is performed by adjusting the size of an input multi-viewpoint image group (viewpoint images) to that of an output composite image. In practice, sampling may be directly done in consideration of the difference in size between input and output images without performing scale conversion.

If necessary, a generated output composite image undergoes a pitch adjustment process. The pitch adjustment process is executed to suppress generation of moiré by deviation of the pattern cycle between an optical element (e.g., a lenticular element or parallax barrier) and a display element (e.g., an LCD) which forms a 3D display. If the pattern cycles match with each other, the pitch adjustment process is unnecessary and is omitted. In the pitch adjustment process, for example, an output composite image undergoes a scaling process in order to adjust deviation. The scaling process adopts bilinear interpolation or the like.

By the above-described composite image conversion process, an output composite image which complies with the device characteristics (3D display parameters) of the second 3D display devices 1205 and 1206 can be generated from an input composite image which copes with the first 3D display device 1209. An appropriate 3D image can be presented to the observer by displaying the output composite image on the 3D display 1205 or printing it by the printer 1206.

Second Embodiment

The first embodiment has described a conversion process when input and output composite images have the same number of viewpoints. To the contrary, the second embodiment will describe a conversion process when the number of viewpoints of an output composite image is smaller than that of an input composite image. The configuration of a 3D display system according to the second embodiment is the same as that according to the first embodiment.

In the composite image conversion process according to the second embodiment, S101 (step of inputting a composite image), S102 (step of acquiring the 3D display parameters of the input composite image), and S103 (step of acquiring the 3D display parameters of an output composite image) are the same as those in the first embodiment. S104 (step of converting a composite image) in which an input composite image is converted into an output composite image on the basis of the input composite image, the 3D display parameters of the input composite image, and those of the output composite image is different from that in the first embodiment.

Figure 13:
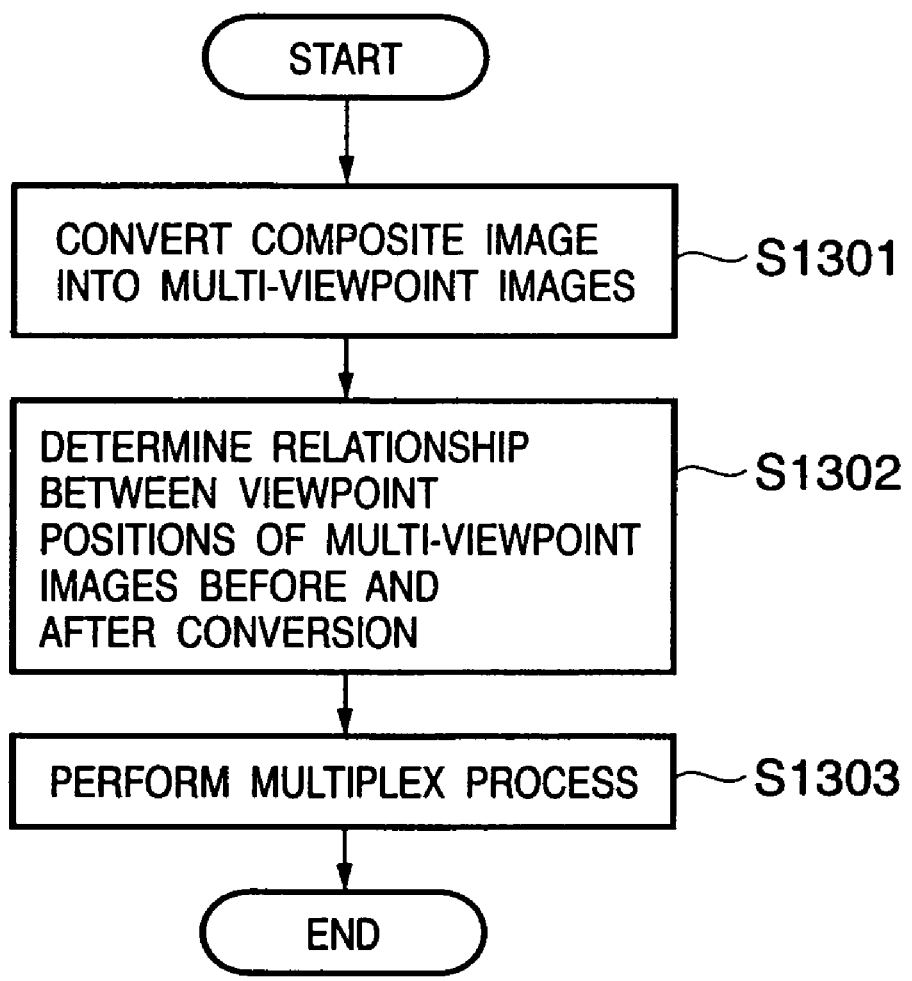
FIG. 13 is a flowchart showing the process of a composite image conversion step according to the second embodiment.

The process in S104 according to the second embodiment is performed by a sequence as shown in FIG. 13. In S1301, similar to the first embodiment, an input composite image is converted into the same number of viewpoint images (multi-viewpoint image group) as the number of viewpoints of the input composite image.

In S1302, viewpoint images for generating an output composite image are selected from the multi-viewpoint image group generated from the input composite image. In the second embodiment, since the number of viewpoints of the output composite image is smaller than that of the input composite image, arbitrary viewpoint images are selected by the number of viewpoints of the output composite image from the multi-viewpoint image group.

Figure 14:
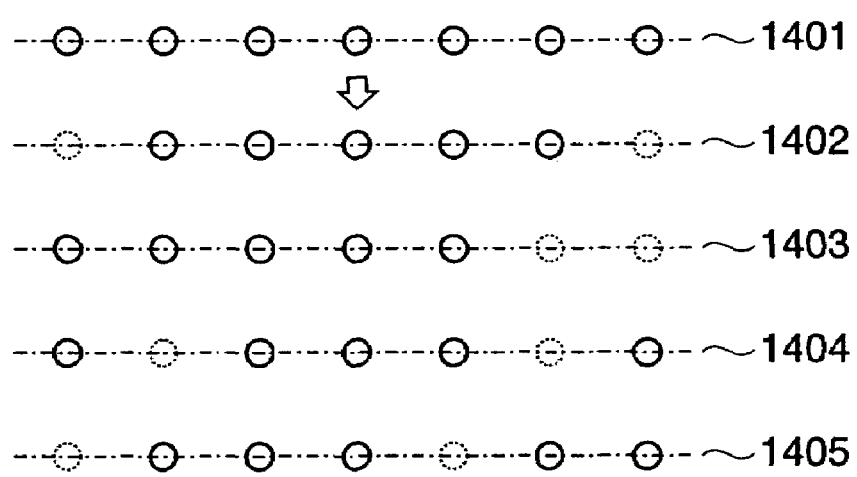
FIG. 14 is a view showing an example of a viewpoint position before and after image conversion according to the second embodiment.

FIG. 14 shows an example of selecting viewpoint images at five viewpoints from an input composite image having seven viewpoints. A dotted line in FIG. 14 represents the moving locus of the viewpoint that is analogized from parallax amount information in each viewpoint image, and the moving locus is formed on a straight or curved line. A circle represents a relative viewpoint position corresponding to each viewpoint image.

Information on the moving locus of the viewpoint and the relative viewpoint position of each viewpoint image is estimated from parallax amount information of multi-viewpoint images or the like by matching or the like.

The parallax distribution range, the photographing base line length, the focal length of a photographing apparatus, and the presence/absence of camera convergence which are contained in the 3D display parameters of an input composite image are also used to estimate a relative viewpoint position.

In FIG. 14, 1401 represents the viewpoints (seven viewpoints) of an input composite image, and 1402 to 1405 represent typical examples of selecting the viewpoints (five viewpoints) of an output composite image from those of the input composite image. When five viewpoints are selected from seven viewpoints, 21 viewpoint selection examples are conceivable from the combination principle. In order to obtain a proper 3D image, the distance between viewpoints is preferably equal. Thus, a practical combination is 1402, 1403, or the symmetrical layout of 1403. In this manner, viewpoint images for generating an output composite image are selected from a multi-viewpoint image group generated from an input composite image in consideration of the amount of parallax between viewpoint images.

A multiplex process in S1303 is the same as that in S503 according to the first embodiment. Also according to the second embodiment, the multiplex process can be smoothly executed in S1301 by properly interpolating missing pixels in multi-viewpoint images.

As described above, even when the number of viewpoints of an output composite image (second 3D display device) is smaller than that of an input composite image (first 3D display device), arbitrary viewpoint images can be properly selected from a multi-viewpoint image group generated from the input composite image, and an output composite image capable of presenting an appropriate 3D image can be generated.

Third Embodiment

The first embodiment has described a conversion process when input and output composite images have the same number of viewpoints. To the contrary, the third embodiment will describe a conversion process when the number of viewpoints of an output composite image is larger than that of an input composite image. The configuration of a 3D display system according to the third embodiment is the same as that according to the first embodiment.

In the composite image conversion process according to the third embodiment, S101 (step of inputting a composite image), S102 (step of acquiring the 3D display parameters of the input composite image), and S103 (step of acquiring the 3D display parameters of an output composite image) are the same as those in the first embodiment. S104 (step of converting a composite image) in which an input composite image is converted into an output composite image on the basis of the input composite image, the 3D display parameters of the input composite image, and those of the output composite image is different from that in the first embodiment.

Figure 15:
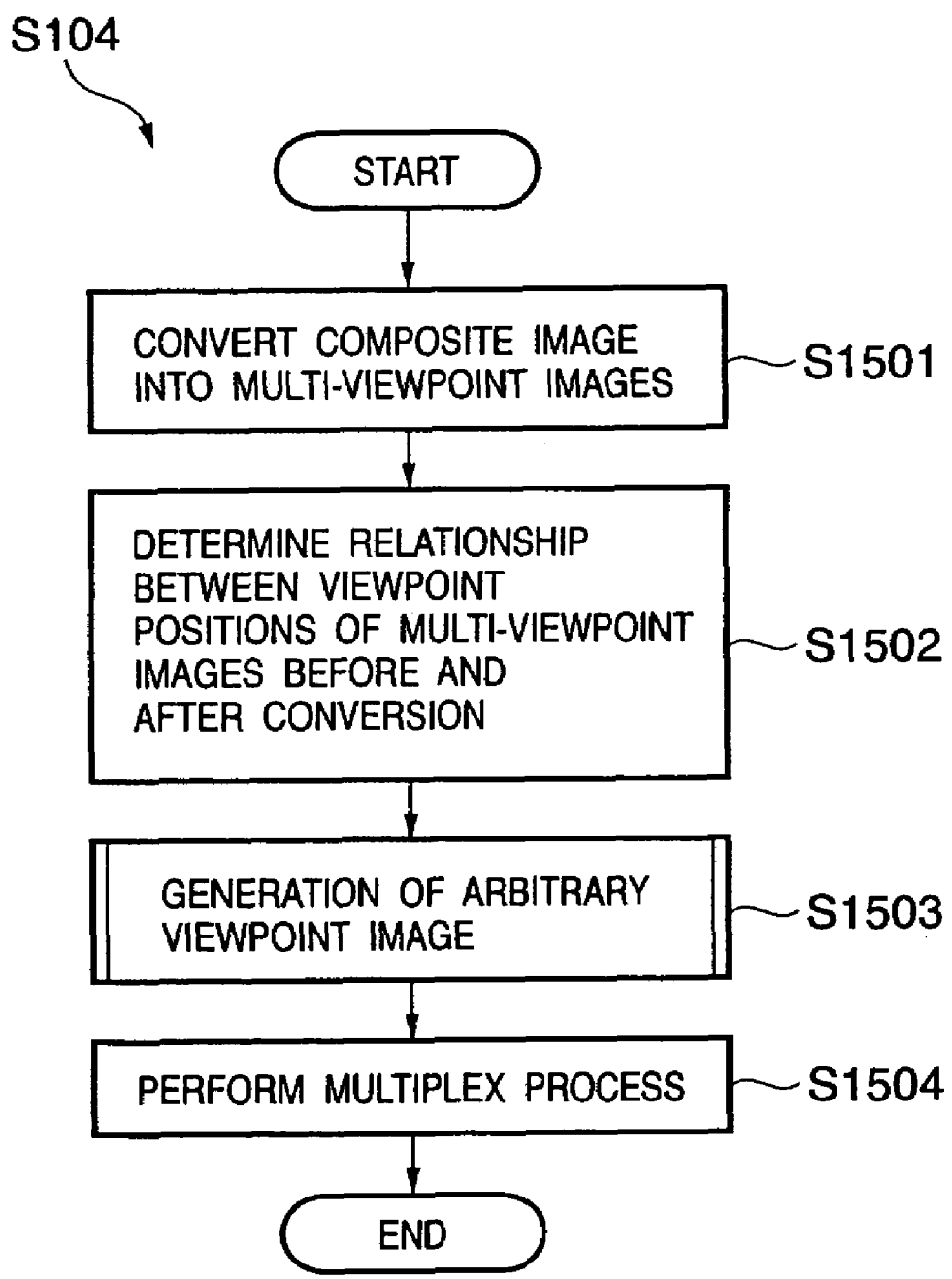
FIG. 15 is a flowchart showing the process of a composite image conversion step according to the third and fourth embodiments.

The process in S104 according to the third embodiment is performed by a sequence as shown in FIG. 15. In S1501, similar to the first embodiment, a multi-viewpoint image group is generated from an input composite image.

In S1502, the viewpoint positions of an output composite image are determined using the viewpoint positions of the input composite image as a reference. More specifically, absent viewpoints are determined in addition to the viewpoints of the input composite image.

Figure 16:
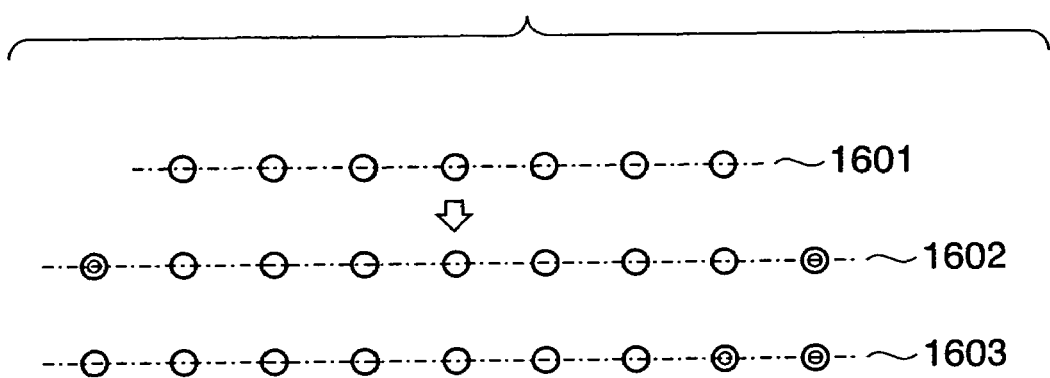
FIG. 16 is a view showing an example of a viewpoint position before and after image conversion according to the third embodiment.

FIG. 16 shows an example of selecting and determining nine viewpoint positions by using, as a reference, the viewpoint positions of seven viewpoints of an input composite image represented by 1601. A dotted line in FIG. 16 represents the moving locus of the viewpoint, a circle represents the relative position of a viewpoint of the input composite image, and a double circle represents a viewpoint position which is determined to be newly generated.

In FIGS. 16, 1602 and 1603 represent the determined viewpoint positions of the output composite image. Although 1602 and 1603 represent examples in which two viewpoints are inserted outside the viewpoint positions of the input composite image, viewpoint positions to be newly added are arbitrary. To obtain a satisfactory 3D effect, the viewpoint positions of an output composite image are preferably set at equal intervals.

In S1503, new viewpoint images corresponding to newly determined viewpoint positions among the viewpoint positions of the output composite image that have been determined in S1502 are generated on the basis of the multi-viewpoint image group generated from the input composite image. By this process, a multi-viewpoint image group containing viewpoint images necessary to generate an output composite image is prepared.

As a method of inputting multi-viewpoint images and generating an arbitrary viewpoint image, there is proposed a technique called image-based rendering, as described in BACKGROUND OF THE INVENTION. More specifically, the depth or parallax distribution information of an image scene is calculated from an input multi-viewpoint image group. By using the depth or parallax distribution information, respective pixels of the input multi-viewpoint image group are mapped at positions on the screen that are proper when observed from new (arbitrary) viewpoint positions. As a result, a new arbitrary viewpoint image can be generated (see, e.g., Japanese Patent Laid-Open No. 2003-209858).

As a method of generating an arbitrary viewpoint image, a combination of image-based modeling and CG may also be adopted. According to this method, model information of each object present in each viewpoint image of an input multi-viewpoint image group is extracted, and a scene is constructed in the CG space using object models. By assuming a CG virtual camera at an arbitrary position, a new arbitrary viewpoint image can be generated. The arbitrary viewpoint image generation method employed in the present invention is not limited to the above one as far as a multi-viewpoint image group which forms an input composite image can be input to generate a viewpoint image corresponding to an arbitrary viewpoint.

In S1504, a multiplex process is done, similar to the first embodiment. In S1504, an output composite image is generated using the multi-viewpoint image group generated from the input composite image and the new viewpoint image generated in S1503.

As described above, according to the third embodiment, even when the number of viewpoints of an output composite image is larger than that of an input composite image, a multi-viewpoint image group generated from the input composite image is input to generate new viewpoint images, thereby generating an output composite image having a desired number of viewpoints.

Fourth Embodiment

In the third embodiment, an output composite image is generated from a multi-viewpoint image group in which new viewpoint images generated by the arbitrary viewpoint image generation method are added to an input multi-viewpoint image group generated from an input composite image. In the fourth embodiment, some or all viewpoint images of a multi-viewpoint image group generated from an input composite image are replaced with viewpoint images generated by the arbitrary viewpoint image generation method, and a multi-viewpoint image group of viewpoint images corresponding to the number of viewpoints of the second 3D display device is prepared to generate an output composite image. In this case, a 3D model whose 3D effect and appearance are adjusted can be displayed.

The fourth embodiment will explain a case wherein the number of viewpoints of an output composite image is larger than that of an input composite image, some viewpoint images of a multi-viewpoint image group generated from an input composite image are replaced with new viewpoint images generated by the above-described arbitrary viewpoint image generation process method, and viewpoint images corresponding to new viewpoints in an output composite image generated by the arbitrary viewpoint image generation process method are added to the resultant multi-viewpoint image group to generate an output composite image. The configuration of a 3D display system according to the fourth embodiment is the same as that according to the first embodiment. All viewpoint images of a multi-viewpoint image group generated from an input composite image may be replaced with new viewpoint images generated by the arbitrary viewpoint image generation process method.

In the composite image conversion process according to the fourth embodiment, S101 (step of inputting a composite image), S102 (step of acquiring the 3D display parameters of the input composite image), and S103 (step of acquiring the 3D display parameters of an output composite image) are the same as those in the first embodiment. S104 (step of converting a composite image) in which an input composite image is converted into an output composite image on the basis of the input composite image, the 3D display parameters of the input composite image, and those of the output composite image is different from that in the first embodiment.

The process in S104 according to the fourth embodiment is performed by the sequence as shown in FIG. 15 which has also been described in the third embodiment. In S1501, similar to the third embodiment, a multi-viewpoint image group is generated from an input composite image.

In S1502, however, the viewpoints of an output composite image are determined. At this time, unlike the third embodiment, at least one viewpoint image of the input multi-viewpoint image group generated from the input composite image is replaced with a new viewpoint image generated by the arbitrary viewpoint image generation method. For this purpose, the amount of parallax in the input multi-viewpoint image group is adjusted to determine a new viewpoint position for improving the appearance of a 3D image.

Figure 17:
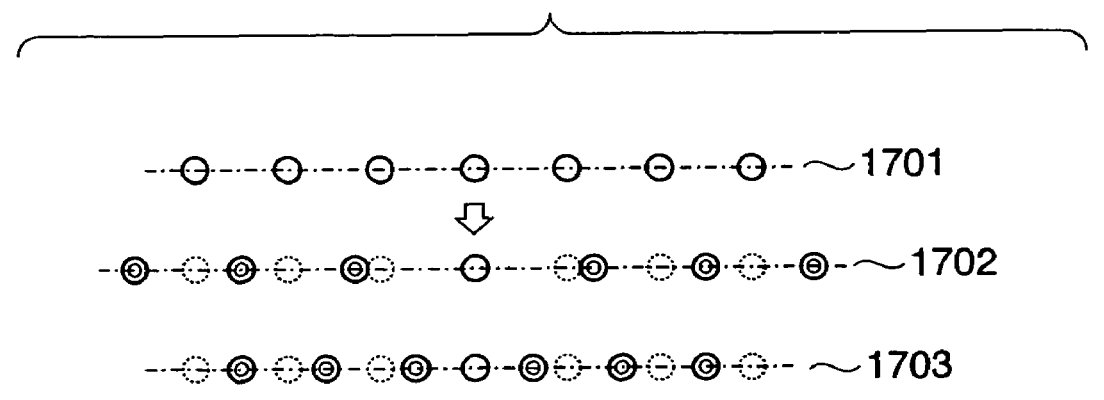

FIG. 17 shows an example in which input and output composite images have the same number of viewpoints for descriptive convenience, new viewpoint images for increasing the amount of parallax of a presented 3D image are generated by the arbitrary viewpoint image generation method, and the new viewpoint images replace some viewpoint images of the multi-viewpoint image group directly generated from the input composite image. In 1701 of FIG. 17, a circle represents the viewpoint position of the input composite image, and a dotted line represents the moving locus of the viewpoint.

1702 represents viewpoint positions when input viewpoint images other than the central viewpoint image in a multi-viewpoint image group generated from the input composite image are replaced with new viewpoint images generated by the arbitrary viewpoint image generation method. A double circle represents a new viewpoint, and a dotted circle represents an original viewpoint position (the viewpoint of an input viewpoint image not used to generate an output composite image). New viewpoints have a larger viewpoint interval than that of original viewpoints. By generating an output composite image using the new viewpoint images, the amount of parallax of a presented 3D image is increased from that of an output 3D image generated from only the original multi-viewpoint image group.

1703 represents the relationship between a new viewpoint position and an original viewpoint position when the amount of presented parallax is decreased in contrast to 1702.

Figure 18:
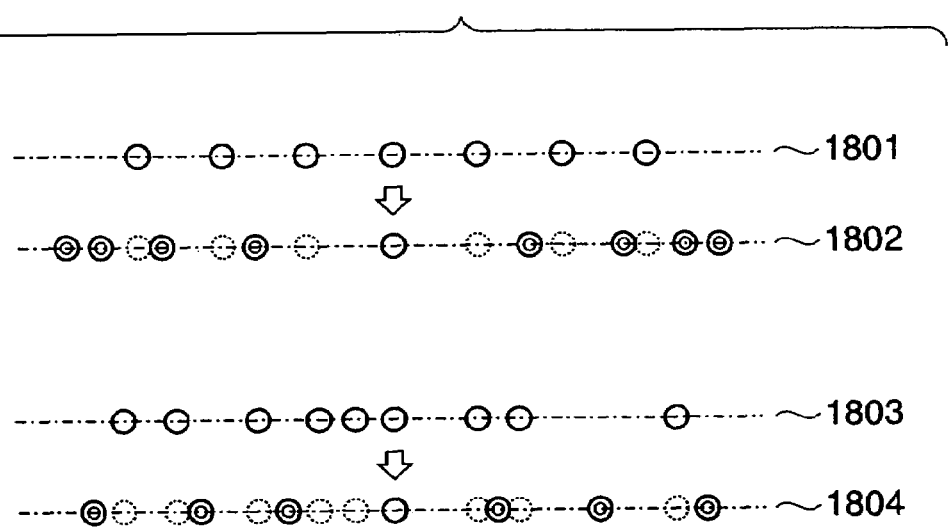
FIG. 18 is a view showing another example of the viewpoint position before and after image conversion according to the fourth embodiment.

In the fourth embodiment, the number of viewpoints of an output composite image is increased from that of an input composite image by adding new viewpoint images in addition to replacement of an input viewpoint image with a new viewpoint image, as described with reference to FIG. 17. In FIGS. 18, 1801 and 1803 represent the viewpoint positions of an input composite image, and 1802 and 1804 represent the viewpoint positions of an output composite image after conversion from the input composite image. The viewpoint positions in 1801 are aligned at equal intervals, whereas the viewpoint positions of the output composite image in 1802 are aligned at unequal intervals in order to adjust the appearance of a 3D image. To the contrary, the viewpoint positions of the input composite image in 1803 are aligned at unequal intervals, whereas the viewpoint positions of the output composite image in 1804 are corrected at equal intervals.

In FIG. 17, the number of viewpoints does not change before and after conversion of a composite image, and viewpoints are aligned at equal intervals. In FIG. 18, the number of viewpoints changes before and after conversion, and the interval of the viewpoints is changed from an equal interval to an unequal interval and from an unequal interval to an equal interval. In this way, when replacement of an input viewpoint image with a new viewpoint image and addition of a new viewpoint image are performed, conditions such as the numbers of viewpoints of a composite image before and after conversion and the viewpoint position are arbitrary.

In other words, the viewpoint position of a new viewpoint image can be determined infinitely. However, considering the appearance of a 3D image, it is desirable to determine all the viewpoints of an output composite image including those of a new viewpoint image at equal intervals.

In S1503, new viewpoint images corresponding to new viewpoints determined in S1502 are generated by the arbitrary viewpoint image generation method. The arbitrary viewpoint image generation method is the same method as that described in the third embodiment.

In S1504, a multiplex process is executed, similar to the first embodiment.

As described above, according to the fourth embodiment, an output composite image is generated by replacing some or all viewpoint images of an input multi-viewpoint image group generated from an input composite image with new viewpoint images generated by the arbitrary viewpoint image generation method. Consequently, an output composite image in which the appearance and 3D effect of a displayed 3D image are adjusted can be generated.

Fifth Embodiment

The fifth embodiment will describe a 3D display system capable of converting an input composite image corresponding to a screen-divisional type 3D display device having a given pixel arrangement into a multi-viewpoint image group and outputting the multi-viewpoint image group. In this case, an output multi-viewpoint image group corresponds to the second 3D image. Since the multi-viewpoint image group can be output, the viewpoint images can be output in time series to display a 3D image on a time-divisional type 3D display.

Figure 19:
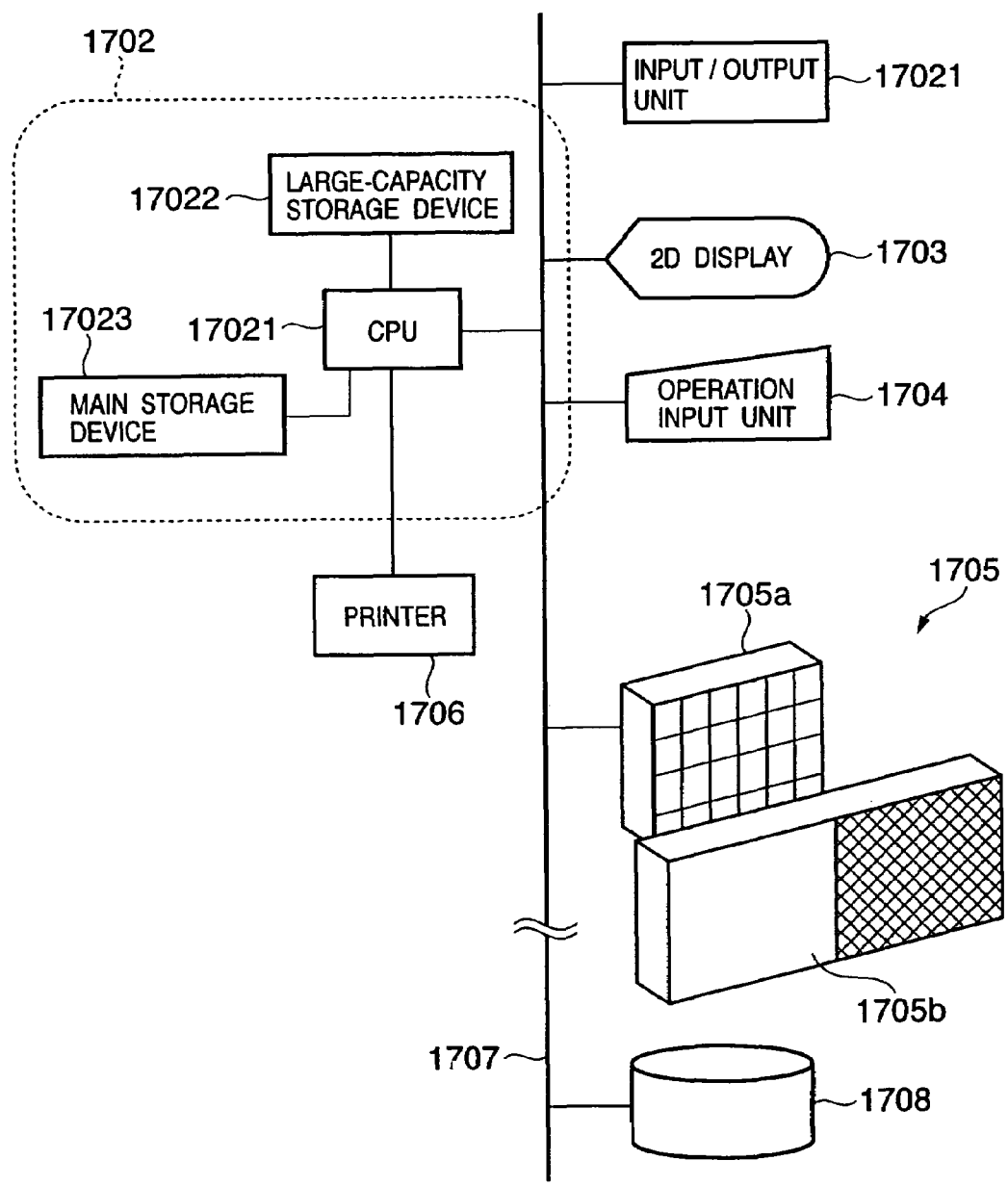
FIG. 19 is a block diagram showing the configuration of an image display system according to the fifth and sixth embodiments.

FIG. 19 shows the configuration of the 3D display system according to the fifth embodiment. An input/output unit 1701, image processing apparatus 1702, 2D display 1703, operation input unit 1704, and printer 1706 which construct the system are identical to the corresponding building elements 1201 to 1204 and 1206 described in the first embodiment. A network 1707 and database 1708 are also identical to those (1207 and 1208) described in the first embodiment.

Reference numeral 1705 denotes a time-divisional 3D display serving as the second 3D display device. The time-divisional 3D display 1705 is a combination of a 2D display 1705a (e.g., an LCD) for displaying two viewpoint images in time series (alternately), and a liquid crystal shutter 1705b in which a light-shielding state and light-transmitting state are alternately switched in two areas so as to guide light from the 2D display 1705a alternately to the right and left eyes of the observer.

One viewpoint image may be output from an input composite image, and displayed on the 2D display 1703 or printed by the printer 1706.

With a combination of the time-divisional 3D display 1705 and an apparatus which detects the head position of the observer, a 3D image when viewed from a current viewpoint can be presented in response to movement of the head, i.e., movement of the viewpoint, like a 3D display device proposed in Japanese Patent Laid-Open No. 7-129792.

Figure 20:
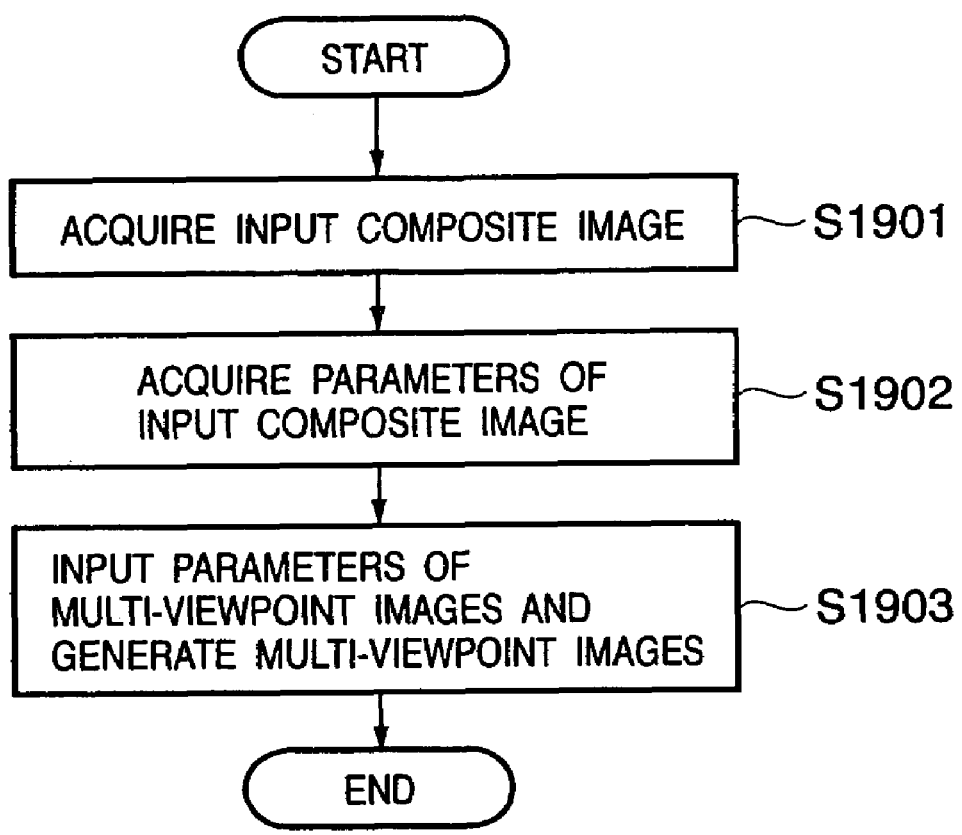
FIG. 20 is a flowchart showing a process by an image processing apparatus according to the fifth and sixth embodiments.

FIG. 20 shows an image conversion sequence according to the fifth embodiment. S1901 (step of inputting a composite image), and S1902 (step of acquiring input image generation parameters) are the same as S101 and S102 in the first embodiment.

In S1903 (step of generating multi-viewpoint images), a multi-viewpoint image group is generated by the same process as that of S501 in S104 of the first embodiment. At this time, information on the number of viewpoints (two in this case) and the interval of the viewpoints (interval between the right and left eyes) as the 3D display parameters of the time-divisional 3D display 1705 is acquired, and two viewpoint images are generated (selected) in accordance with the information. The two viewpoint images are alternately output to the time-divisional 3D display 1705, presenting a 3D image.

Sixth Embodiment

The sixth embodiment will explain a case wherein in the process of conversion into a multi-viewpoint image group described in the fifth embodiment, a new viewpoint image is generated by the above-described arbitrary image generation method, and the new viewpoint image can replace a viewpoint image directly generated from an input composite image or can be added to the multi-viewpoint image group. This process can change the appearance of a 3D image on the time-divisional 3D display 1705 described in the fifth embodiment. In the use of a 3D display device as a combination of the time-divisional 3D display 1705 and a head position detection apparatus, head position information can be acquired as a 3D display parameter from the detection apparatus to generate viewpoint images corresponding to two arbitrary viewpoints. The generated new viewpoint image can be displayed as a 2D image on the 2D display 1703 in the fifth embodiment, or printed by the printer 1706. The configuration of the sixth embodiment is the same as that of the fifth embodiment.

FIG. 20 shows an image conversion sequence according to the sixth embodiment. S1901 (step of inputting a composite image), and S1902 (step of acquiring input image generation parameters) are the same as those in the fifth embodiment.

Figure 21:
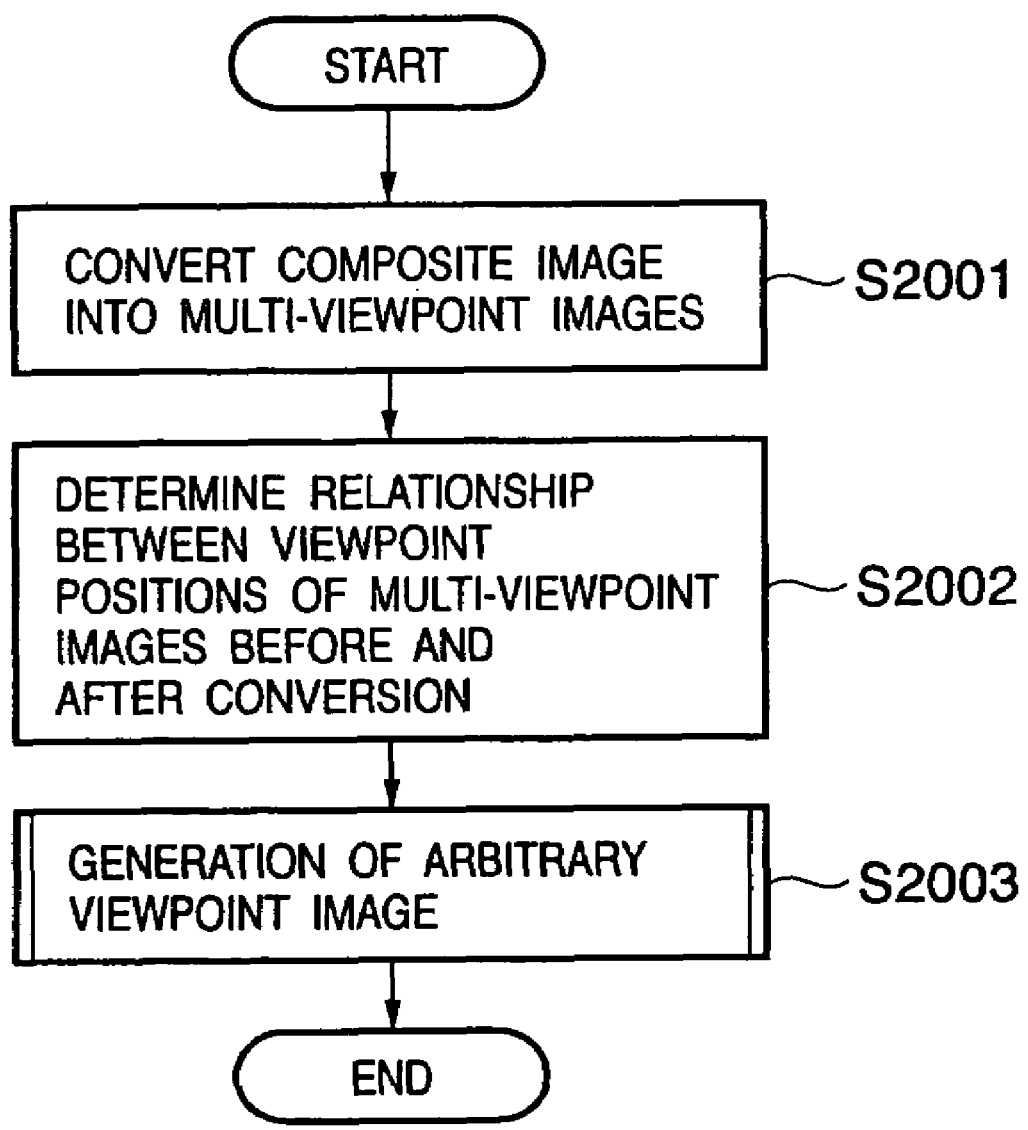
FIG. 21 is a flowchart showing the process of an image conversion step according to the sixth embodiment.

In S1903, a process shown in FIG. 21 is executed. In FIG. 21, S2001 (step of converting an image into multi-viewpoint images), S2002 (step of determining the viewpoint positions of the converted multi-viewpoint images), and S2003 (step of generating an arbitrary viewpoint image) are the same as S1501 to S1503 in FIG. 15 according to the third embodiment. A new viewpoint image generated in S2003 is output.

As described above, according to the above embodiments, even when there is only a composite image complying with the specifications (3D display parameters) of a given 3D display device (e.g., the pixel arrangement style of the 3D display device, the number of viewpoints, and the amount of presented parallax), the composite image can be input to generate a composite image or multi-viewpoint images optimal for a 3D display device of different specifications.

The following inventions can also be derived from the above embodiments.

1. An image processing program or image processing apparatus which performs a process of converting the first 3D image for a 3D display device having an arbitrary pixel arrangement into the second 3D image for a 3D display device having another arbitrary pixel arrangement.

2. An image processing program or image processing apparatus which, when the number of viewpoints of the second 3D image is smaller than that of the first 3D image in the conversion process, selects viewpoint images corresponding to the viewpoints of the second 3D image to generate an output 3D image.

3. An image processing program or image processing apparatus which performs conversion into multi-viewpoint images by an interpolation method using decomposition into color information and luminance information for interpolation of missing pixels in the conversion process.

4. An image processing program or image processing apparatus which performs conversion into multi-viewpoint images by an interpolation method using an edge image as interpolation control information for interpolation of missing pixels in the conversion process.

5. An image processing program or image processing apparatus which performs conversion into multi-viewpoint images by an interpolation method using pixel information in adjacent viewpoint images for interpolation of missing pixels in the conversion process.

6. An image processing program or image processing apparatus which performs conversion into multi-viewpoint images by an interpolation method using pixel information in adjacent frames for interpolation of missing pixels in the conversion process.

7. An image processing program or image processing apparatus which, when the number of viewpoints of the second 3D image is larger than that of the first 3D image in the conversion process, performs an arbitrary viewpoint image generation process of generating a new viewpoint image, and generates an output 3D image by using the new viewpoint image.

8. An image processing program or image processing apparatus which performs, in the conversion process, an arbitrary viewpoint image generation process of generating a new viewpoint image on the basis of input multi-viewpoint images that form an input 3D image, replaces some or all of the input multi-viewpoint images with the newly generated image, and generates an output 3D image that improves the appearance of a 3D image.

9. An image processing program or image processing apparatus which extracts correspondence points representing the same object part in point-to-point correspondence by a matching process to construct a parallax map in the arbitrary viewpoint image generation process.

According to the above-described embodiments, a 3D image corresponding to a given 3D display device can be generated from a 3D image corresponding to another 3D display device having different 3D display parameters. This can improve the portability of image contents serving as the source of a 3D image.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-300895 filed on Oct. 15, 2004, which is hereby incorporated by reference herein.

What is claimed is:

1. A computer readable medium for storing a computer program causing a computer to execute an image processing method, said method comprising:

a first step of acquiring a first parameter serving as a parameter associated with 3D display on a first 3D display device, acquiring a first 3D image data for the first 3D display device corresponding to the first parameter, and storing the first 3D image data and the first parameter to a storage device;

a second step of acquiring a second parameter serving as a parameter associated with 3D display on a second 3D display device, and storing the storage device the second parameter; and a third step of generating a second 3D image data for the second 3D display device corresponding to the second parameter on the basis of the first 3D image, the first parameter, and the second parameter by a controller;

wherein in the third step, a plurality of viewpoint images corresponding to a plurality of viewpoints of the first 3D image data are generated on the basis of the first 3D image data, a new viewpoint image corresponding to, out of a plurality of viewpoints of the second 3D image data, a viewpoint which is not included in viewpoints of the first 3D image data is generated using an arbitrary viewpoint image generation method, and the second 3D image data is generated on the basis of the plurality of viewpoint images, the new viewpoint image, the first parameter, and the second parameter.

2. The computer readable medium for storing a computer program according to claim 1, wherein the second 3D image data is different from the first 3D image data in at least pixel arrangement.

3. The computer readable medium for storing a computer program according to claim 1, wherein the first parameter is different from the second parameter.

4. The computer readable medium for storing a computer program according to claim 1, wherein the first parameter and the second parameter include at least one of the number of viewpoints, an interval of viewpoints, a pixel arrangement style, and an amount of parallax.

5. The computer readable medium for storing a computer program according to claim 1, wherein in the third step, at least some of the plurality of viewpoint images are replaced with new viewpoint images generated by an arbitrary viewpoint image generation method.

6. An image processing apparatus comprising:
- a computer unit in which a computer readable medium for storing a computer program defined in claim 1 runs;
- an input unit which receives the first 3D image data; and
- an output unit which outputs the second 3D image data.

7. The computer readable medium for storing a computer program according to claim 1, wherein the arbitrary viewpoint image generation method includes image-based renderings.

* * * * *